US006441118B2

(12) United States Patent
Sherman et al.

(10) Patent No.: US 6,441,118 B2
(45) Date of Patent: *Aug. 27, 2002

(54) POLYDIORGANOSILOXANE OLIGOUREA SEGMENTED COPOLYMERS AND A PROCESS FOR MAKING SAME

(75) Inventors: Audrey A. Sherman, St. Paul, MN (US); Walter R. Romanko, Austin, TX (US); Albert I. Everaerts, Oakdale, MN (US); Charles M. Leir, Falcon Heights, MN (US); Mieczyslaw H. Mazurek, Roseville, MN (US); Constance J. Nelson, Woodbury, MN (US)

(73) Assignee: 3M Innovative Properties Company, St. Paul, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/930,403

(22) PCT Filed: Apr. 25, 1996

(86) PCT No.: PCT/US96/05870

§ 371 (c)(1),
(2), (4) Date: Sep. 26, 1997

(87) PCT Pub. No.: WO96/34030

PCT Pub. Date: Oct. 31, 1996

(51) Int. Cl.$^7$ .............................................. C08G 77/26
(52) U.S. Cl. ........................................................ 528/28
(58) Field of Search ................... 528/28, 38; 525/477, 525/474, 454; 522/148, 172, 174

(56) References Cited

U.S. PATENT DOCUMENTS

| 2,676,182 A | 4/1954 | Daudt et al. ............. 260/448.2 |
| 2,736,721 A | 2/1956 | Dexter ......................... 260/42 |
| 2,814,601 A | 11/1957 | Currie et al. .............. 260/29.1 |
| 2,857,356 A | 10/1958 | Goodwin, Jr. ................ 260/42 |
| 3,528,940 A | 9/1970 | Modic ......................... 260/37 |
| 3,562,352 A | 2/1971 | Nyilas ......................... 260/824 |
| 3,772,247 A | 11/1973 | Flannigan .................. 260/46.5 |
| 3,890,269 A | 6/1975 | Martin ....................... 260/46.5 |
| 4,117,192 A | 9/1978 | Jorgensen .................. 428/337 |
| 4,447,493 A | 5/1984 | Driscoll et al. ............. 428/332 |
| 4,518,758 A | 5/1985 | Cavezzan et al. ............ 528/12 |
| 4,528,343 A | 7/1985 | Kira ............................ 528/26 |
| 4,539,345 A | 9/1985 | Hansen ....................... 523/219 |
| 4,563,539 A | 1/1986 | Gornowicz et al. ......... 556/421 |
| 4,605,712 A | 8/1986 | Mueller et al. ............. 525/474 |
| 4,736,048 A | 4/1988 | Brown et al. ............... 556/454 |
| 4,900,474 A | 2/1990 | Terae et al. ................. 252/358 |
| 4,908,208 A | 3/1990 | Lee et al. .................... 424/409 |
| 4,933,396 A | 6/1990 | Leir et al. ................... 525/410 |
| 4,948,859 A | 8/1990 | Echols et al. ................ 528/28 |
| 4,985,526 A | 1/1991 | Kishita et al. ............... 528/15 |
| 5,028,679 A | 7/1991 | Terae et al. .................. 528/12 |
| 5,091,483 A | 2/1992 | Mazurek et al. ............ 525/477 |
| 5,118,775 A | 6/1992 | Inomata et al. ............. 528/12 |
| 5,194,113 A | 3/1993 | Lasch et al. ................ 156/243 |
| 5,213,879 A | 5/1993 | Niwa et al. ................. 428/213 |
| 5,214,119 A | 5/1993 | Leir et al. .................... 528/28 |
| 5,221,724 A | * 6/1993 | Li et al. ...................... 528/28 |
| 5,236,997 A | 8/1993 | Fujiki ......................... 524/731 |
| 5,268,433 A | 12/1993 | Ikeno et al. ................. 525/478 |
| 5,279,896 A | 1/1994 | Tokunaga et al. ........... 428/355 |
| 5,286,815 A | 2/1994 | Leir et al. .................... 525/477 |
| 5,290,615 A | 3/1994 | Tushaus et al. .............. 428/40 |
| 5,314,748 A | 5/1994 | Mazurek et al. ............ 428/345 |
| 5,391,015 A | 2/1995 | Kaczmarczik et al. ........ 404/14 |
| 5,461,134 A | 10/1995 | Leir et al. .................... 528/14 |
| 5,468,815 A | 11/1995 | Boardman et al. .......... 525/478 |
| 5,589,563 A | * 12/1996 | Ward et al. ................... 528/44 |
| 5,670,598 A | * 9/1997 | Leir et al. .................... 528/28 |

FOREIGN PATENT DOCUMENTS

| DE | 3143994 | 5/1983 | ............ B29D/7/02 |
| EP | 0 250 248 | 12/1987 | ........... C08G/77/54 |
| EP | 0 311 262 | 4/1989 | ........... C08L/83/08 |
| EP | 455 585 | * 6/1991 | |
| EP | 0 455 585 | 11/1991 | ......... C08G/77/388 |
| EP | 0 540 332 | 5/1993 | ............ F16F/9/30 |
| JP | 4-214341 | 8/1992 | ........... B32B/27/00 |
| WO | WO 95/03354 | 2/1995 | ........... C08G/77/26 |

OTHER PUBLICATIONS

Parin, "Constrained Layer Viscoelastic Vibration Damping," Techical Paper, *Society of Manufacturing Engineers*, (1989).
Yilgor et al., "Segmented Organosiloxane Copolymers—1. Synthesis of Siloxane—Urea Copolymers," *Polymer*, vol. 25, pp. 1800–1806 (Dec. 1984).
Tyagi et al., "Segmented Organosiloxane Copolymers—2. Thermal and Mechanical Properties of Siloxane—Urea Copolymers," *Polymer*, vol. 25, pp. 1807–1816 (Dec. 1984).
Tyagi et al., "Solid State Properties of Segmented Polysiloxane Thermoplastic Elastomeric Copolymers," *Polymer Preprints*, vol. 24, No. 2, pp. 39–40 (Aug. 1983).

* cited by examiner

*Primary Examiner*—Margaret G. Moore
(74) *Attorney, Agent, or Firm*—Michael S. Sherrill; Carolyn V. Peters

(57) ABSTRACT

The present invention provides polydiorganosiloxane oligourea segmented copolymers. The copolymers contain soft polydiorganosiloxane units, hard segments that are diisocyanate residues, the polydiorganosiloxane units and diisocyanate residues being connected by urea linkages, and terminal groups that are non-reactive, reactive under free radical or moisture cure conditions, or amines. The invention also provides methods of preparing the copolymers.

40 Claims, No Drawings

POLYDIORGANOSILOXANE OLIGOUREA SEGMENTED COPOLYMERS AND A PROCESS FOR MAKING SAME

FIELD OF THE INVENTION

This invention relates to polydiorganosiloxane oligourea segmented copolymers and a process for making same.

BACKGROUND OF THE INVENTION

Polydiorganosiloxane polymers have unique properties derived mainly from the physical and chemical characteristics of the siloxane bond. Typically, the outstanding properties of polydiorganosiloxane polymers include resistance to ultraviolet light, extremely low glass transition temperature, good thermal and oxidative stability, good permeability to many gases, very low surface energy, low index of refraction, good hydrophobicity, and good dielectric properties. They also have very good biocompatability and are of great interest as biomaterials that can be used in the body in the presence of blood. Polydiorganosiloxane elastomers have been widely used because of these many excellent properties. But, their limited tear resistance and poor resistance to low polarity solvents have made them unsuitable in many other applications.

Elastomers possess the ability to recover their initial shape from deformation produced by an imposed force. Traditional polydiorganosiloxanes show elastomeric behavior only when they are chemically or physically crosslinked. Even extremely high molecular weight polydiorganosiloxane gums (greater than 500,000 grams per mole) exhibit cold flow when uncrosslinked. However, chemical crosslinking results in polymers with poor mechanical properties relative to other organic materials. Thus, to be useful in most commercial applications, traditional polydiorganosiloxanes must be further filled with up to 50 weight percent fillers such as finely divided high surface area silica, fumed silica, titanium dioxide, alumina, zirconia, pigment-grade oxides, carbon blacks, graphite, metal powders, clays, calcium carbonates, silicates, aluminates, fibrous fillers, and hollow glass or plastic microspheres, depending on the desired properties, for example, to maintain their mechanical strength and reduce swelling in solvents. Since polydiorganosiloxanes do not lose their mechanical strength as abruptly as other organic materials at elevated temperatures, they find particular use in high temperature applications.

For many uses such as in insulated wire, rods, channels, tubing, and similar products, polydiorganosiloxane compounds are extruded in standard rubber extrusion equipment. The extruded material must immediately be heated to set the form. Usually, hot-air vulcanization at 300–450° C. or steam at 0.28–0.70 MPa (40–100 psi) for several minutes is needed. Final properties can be developed by oven curing or by continuous steam vulcanization.

For many other uses such as in elastomers, caulking, gaskets, sealants, and release coatings, polydiorganosiloxane compounds are applied as liquids or deformable semi-solids at room temperature and require intimate mixing if two part systems are used. Final properties are developed after lengthy cure times and are generally inferior. Often a delay occurs before the next sequence in manufacture or repair can proceed.

In recent years, free radically cured and moisture cured liquid polydiorganosiloxane compositions have been disclosed that cure rapidly and completely under exposure to radiation or moderately elevated temperatures with excellent properties. Thus, subsequent manufacturing or repair steps are often delayed until some degree of curing occurs. Also, thick constructions cannot be made without temporary support until curing is accomplished and irregularly shaped surfaces can be difficult to coat adequately. Therefore, there is still a need for polydiorganosiloxane compositions with green strength, i.e., strength in the uncured state, and controlled flow properties.

Silicone-based release coatings have been used commercially for some time, predominantly in such applications as release liners for adhesives. Generally, these materials are coated from solvent or a carrier and thermally crosslinked at high temperatures. Recently, silicone release technologies have been disclosed that include addition cure, cationic cure, radiation cure, and moisture cure of monomer, oligomer or polymer systems as well as silicone-containing block copolymers that do not require curing. Some of these systems can be coated without solvent, e.g., by roll coating. Others can be coated from organic solvents or water. There is still a need for a silicone-based coating with controlled flow properties and good green strength while retaining the desirable release performance features of the previously mentioned materials.

Physically crosslinked polydiorganosiloxane polyurea segmented copolymers, that may contain blocks other than polydiorganosiloxane or urea, are elastomers that are synthesized in and coated out of solvent. These copolymers have some potential process economy advantages because their synthesis reaction is rapid, requires no catalyst, and produces no by-products.

In producing polydiorganosiloxane polyurea segmented copolymers, monofunctional reaction impurities in the polydiorganosiloxane diamine precursor can inhibit the chain extension reaction and limit the attainment of optimum molecular weight and tensile strength of the polymer. Because the early processes for making the polydiorganosiloxane diamines resulted in increasing levels of monofunctional impurities with increasing molecular weight, it was not possible to achieve elastomers having satisfactory mechanical properties for most elastomer or adhesive applications. More recently, processes have been developed that produce low levels of impurities over a wide range of polydiorganosiloxane diamine molecular weights. With these processes polydiorganosiloxane polyurea segmented copolymers have been obtained that have good mechanical properties through the use of chain extenders to increase the non-silicone content. However, these systems, with or without chain extender, do not flow at room temperature.

Continuous melt polymerization processes have been used to produce polyurethane elastomers and acrylate pressure-sensitive adhesives. Polyetherimides, which can contain polydiorganosiloxane segments, have also been produced in a continuous melt polymerization process. Recently polyurethane resins have been described that use polydiorganosiloxane urea segments to prevent blocking of films formed from the resin. However, levels of reactive polydiorganosiloxane in the compositions were small, for example, less than 15 weight percent, and incomplete incorporation of the polydiorganosiloxane into the backbone was not detrimental since easy release was the intent. Unincorporated polydiorganosiloxane oil can, however, act as a plasticizing agent in elastomers to reduce tensile strength or detackify and reduce shear properties of pressure-sensitive adhesives. This unincorporated oil can also bloom to the surface of an elastomer or adhesive and contaminate other surfaces with which it is in contact.

SUMMARY OF THE INVENTION

Briefly, in one aspect of the present invention, polydiorganosiloxane oligourea segmented copolymers are provided wherein such copolymers comprise soft polydiorganosiloxane diamine units, hard polyisocyanate residue units, wherein the polyisocyanate residue is the polyisocyanate minus the —NCO groups, optionally, soft and/or hard organic polyamine units, wherein residues of the isocyanates amine units are connected by urea linkages, and terminal groups, wherein the terminals groups are non-functional endcapping groups or functional endcapping groups.

The present invention further provides polydiorganosiloxane oligourea segmented copolymer compositions comprising the reaction product of (a) at least one polyisocyanate;
(b) an endcapping agent having a terminal selected from polydiorganosiloxane monoamines and non-siloxane containing endcapping agents having a terminal portion reactive with an amine or isocyanate and a terminal portion that is non-functional or that can react under moisture-cure or free-radical conditions, with the provisos (1) that if no polydiorganosiloxane monoamine is present, then at least one polyamine is present, wherein polyamine comprises at least one polydiorganosiloxane diamine or a mixture of at least one polydiorganosiloxane diamine and at least one organic polyamine, (2) if only polyisocyanate and polyamine are present, the molar ratio of isocyanate to amine is <0.9:1 or >1.1:1, and (3) when polydiorganosiloxane monoamine and diamine are present, the ratio of total isocyanate available in the polyisocyanate to the total amine available in the monoamine and diamine less any amine end groups in the copolymer is about 1:1.

The polydiorganosiloxane oligourea segmented copolymer compositions of the present invention can be represented by Formula I. Anyone knowledgeable in the art would know that the oligomerization process leads to randomization of the polydiorganosiloxane diamine and organic polyamines along the back one. This could lead to the organic polyamine reacting with the endcapper.

each R is a moiety independently selected from alkyl moieties preferably having about 1 to 12 carbon atoms and may be substituted with, for example, trifluoroalkyl or vinyl groups, a vinyl radical or higher alkenyl radical preferably represented by the formula —R²(CH₂)ₐCH=CH₂ wherein R² is —(CH₂)ᵦ— or —(CH₂)cCH=CH— and a is 1, 2 or 3, b is 0, 3 or 6; and c is 3, 4 or 5; a cycloalkyl moiety having about 6 to 12 carbon atoms and may be substituted with alkyl, fluoroalkyl, and vinyl groups, or an aryl moiety preferably having about 6 to 20 carbon atoms and that may be substituted with, for example, alkyl, cycloalkyl, fluoroalkyl and vinyl groups or R is a perfluoroalkyl group as described in U.S. Pat. No. 5,028,679, wherein such description is incorporated herein by reference, a fluorine-containing group as described in U.S. Pat. No. 5,236,997, wherein such description is incorporated herein by reference or a perfluoroether-containing group, as described in U.S. Pat. Nos. 4,900,474 and 5,118,775, wherein such descriptions are incorporated herein by reference, preferably at least 50% of the R moieties are methyl radicals with the balance being monovalent alkyl or substituted alkyl radicals having 1 to 12 carbon atoms, vinylene radicals, phenyl radicals, or substituted phenyl radicals;

each Y is a polyvalent moiety independently selected from an alkylene radical preferably having 1 to 10 carbon atoms, aralkylene radical and arylene radical, preferably having 6 to 20 carbon atoms;

each D is independently selected from hydrogen, alkyl radicals preferably having 1 to 10 carbon atoms, phenyl, and a radical that completes a ring structure including B or Y to form a heterocycle, preferably having about 6 to 20 carbon atoms;

each A is independently —B—, or —YSi(R)₂(OSi(R)₂)ₚY— or mixtures thereof;

B is a polyvalent radical selected from the group consisting of alkylene, aralkylene, cycloalkylene, phenylene,

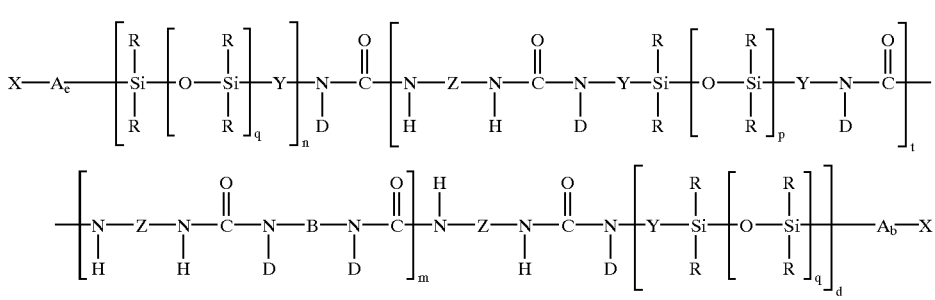

wherein each Z is a polyvalent radical selected from arylene radicals and aralkylene radicals preferably having from about 6 to 20 carbon atoms, alkylene and cycloalkylene radicals preferably having from about 6 to 20 carbon atoms, preferably Z is 2,6-tolylene, 4,4'-melthylenediphenylene, 3,3'-dimethoxy-4,4'-biphenylene, tetramethyl-m-xylylene, 4,4'-methylenedicyclohexylene, 3,5,5-trimethyl-3-methylenecyclohexylene, 2,2,4-trimethylhexylene, 1,6-hexamethylene, 1,4-cyclohexylene, and mixtures thereof;

polyalkylene oxide, such as, polyethylene oxide, polypropylene oxide, polytetramethylene oxide, and copolymers thereof, and mixtures thereof;

m is a number that is 0 to about 8;

b, e, d and n are 0 or 1, with the provisos that, b+d=1 and e+n=1;

p is about 10 or larger, preferably about 15 to 2000, more preferably about 30 to 1500;

q is about 10 or larger, preferably about 15 to 2000, more preferably about 30 to 1500; and t is a number which is 0 to about 8;

s is 0 or 1; and each X is independently:
(a) a moiety represented by

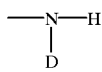

(II)

wherein D is defined as above;
(b) a moiety represented by

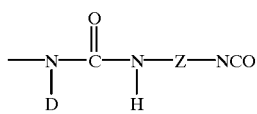

(III)

where each of D, and Z are defined as above,
(c) a monovalent moiety that is not reactive under moisture curing or free radical curing conditions and that can be the same or different and that are alkyl moieties preferably having about 1 to 20 carbon atoms and that can be substituted with, for example, trifluoroalkyl groups, or aryl moieties preferably having about 6 to 20 carbon atoms and that may be substituted with, for example alkyl, aryl, and substituted aryl groups and a particularly useful embodiment when X is C, is when $t=0$ and $m=0$;
(d) a moiety represented by

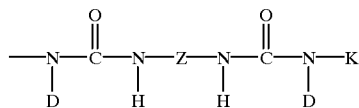

(IV)

where each of Z, and D are defined as above,
K is independently (i) a moiety that is not reactive under moisture curing or free radical curing conditions and that can be the same or different selected from the group consisting of alkyl, substituted alkyl, aryl, and substituted aryl; (ii) a free radically curable end group such as, for example acrylate, methacrylate, acrylamido, methacrylamido and vinyl groups; (iii) a moisture curable group such as, for example, alkoxysilane and oxime silane groups, and
(e) a moiety represented by

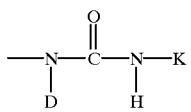

(V)

wherein D, Y and K are defined as above.
In the use of polyisocyanates (Z is a radical having a functionality greater than 2) and polyamines (B is a radical having a functionality greater than 2), the structure of Formula I will be modified to reflect branching at the polymer backbone.

The average degree of oligomerization refers to the size of the resultant oligomer molecule and is determined from the number average of the residue of amine-containing reactant molecules in the oligomer. There are two ways of obtaining the desired degree of oligomerization: (1) control the isocyanate to amine ratio to obtain either isocyanate or amine endcapped oligomer (X=a or b), and (2) judiciously select the amount of monoamine or monoisocyanate endcapper with stoichiometric amounts of isocyanate and amine (X=c, d, or e). The following table displays the mol ratios of the various molecules necessary for building a molecule with the desired endcapper X. For the use of polyamines and polyisocyanates, the ratios may be adjusted accordingly.

|  | X(a) | X(b) | X(c) | X(d) | X(e) |
|---|---|---|---|---|---|
| Degree of oligomerization | t + m + 2 | t + m + 2 | t + m + 2 | t + m + 4 | t + m + 2 |
| Polydiorganosiloxane diamine | t + m + 2 | t + m + 2 | t + m + 2 | t + m + 2 | t + m + 2 |
| Diisocyanate | t + m + 1 | t + m + 3 | t + m + 1 | t + m + 3 | t + m + 1 |
| Polydiorganosiloxane monoamine | — | — | 2 | — | — |
| Organic monoamine | — | — | — | 2 | — |
| Monoisocyanate | — | — | — | — | 2 |

The polydiorganosiloxane oligourea segmented copolymers of the present invention can be prepared to exhibit desired controlled flow properties in the uncured state, being liquid or semi-solid at ambient temperatures. The controlled flow properties of the copolymer can be optimized by appropriate selection of the polyisocyanate, the molecular weight of the polydiorganosiloxane amine, the average degree of oligomerization, the organic polyamine selected, and the nature of Z. Generally, the green strength of the resultant polydiorganosiloxane polyurea segmented oligomer increases with decreasing polydiorganosiloxane amine molecular weight. The compositions of the present invention have an average degree of oligomerization of between 2 and 12.

The polydiorganosiloxane oligourea segmented copolymers of the present invention have diverse utility. The copolymers possess the conventional excellent physical properties associated with polysiloxanes of low glass transition temperature, high thermal and oxidative stabilities, UV resistance, low surface energy and hydrophobicity, good electrical properties and high permeability to many gases.

When the polydiorganosiloxane oligourea segmented copolymers are terminated with non-functional end groups, the resulting copolymers possess the thermally reversible properties of a gel, semisolid, or solid at room temperature and of a fluid at elevated temperatures. Selected polydiorganosiloxane oligourea segmented copolymers of the present invention have a surprisingly low melt flow viscosity and abrupt solidification at a temperature below the melt flow conditions. Additionally, these selected copolymers exhibit ease of reprocessing without additional stabilizers that make them suitable as thermally reversible encapsulants and potting compounds or as caulking compounds where sharp or reversible liquid/solid transitions are desired, for example, such as in assembly line operations.

Advantageously, the selection of the terminal group used to prepare the copolymers of the present invention can provide a variety of materials having various properties. The terminal groups of the copolymer can either be non-functional or functional. If the terminal group is a functional end-capping group, the resultant copolymers have a latent reactivity, such that these functional end-capped copolymers can serve as prepolymer units, can be crosslinked, can be cured, and the like.

When the polydiorganosiloxane oligourea segmented copolymers of the present invention are terminated with reactive amine end groups, they can be further reacted with multifunctional isocyanates, multifunctional acrylates, multifunctional anhydrides, or mixtures thereof to obtain various crosslinked branched, or chain-extended materials.

When the polydiorganosiloxane oligourea segmented copolymers of the present invention are terminated wvitlh reactive isocyanate end groups, they can be further reacted with water, multifunctional amines, multifunctional alcohols, multifunctional mercaptans, or mixtures thereof to obtain various crosslinked branched, or chain-extended materials.

Additionally, when the polydiorganosiloxane oligourea segmented copolymers of the invention are terminated with a chemically curable end group, the resulting green strength, that is, strength prior to curing, is generally greater than that for chemically crosslinkable silicone compositions known in the art.

The polydiorganosiloxane oligourea segmented copolymers of the present invention having free radically curable end groups can be solution coated or hot melt coated easily without placirg adverse stresses into the coating and can be formed into irregular shapes that will hold their shape until they are thermally or radiation cured. Such a feature makes them useful, for example, in applications such as gaskets, sealants, and replicated surfaces and coatings on easily deformable substrates.

The polydiorganosiloxane oligourea segmented copolymers of the present invention having moisture curable end groups can be solution coated or hot melt coated in a manner similar to the free radically cured forms, or applied to a variety of irregular substrates in situations that do not allow subsequent thermal or radiation curing treatments or in which free radical reactions are inhibited by the presence of oxygen. Such characteristics make them useful, for example, in applications in the building construction industry, such as caulking and sealants, and in areas where oxygen inhibited radiation or thermal treatments are not preferred.

The polydiorganosiloxane oligourea segmented copolymers of the present invention with both free radically curable end groups and moisture curable end groups are useful, for example, in situations where partial cure by one mechanism is desirable followed by complete cure by another method. Areas where this feature is useful include situations where a subsequent manufacturing operation is desired and superior green strength is beneficial, such as in assembly line operations.

The present invention further provides a solvent process and a solventless process for producing the polydiorganosiloxane oligourea segmented copolymers of the present invention.

The solvent process comprises the steps of
providing reactants, wherein the reactants comprise (a) a polyisocyanate; (b) an endcapping agent selected from polydiorganosiloxane monoamines and non-siloxane containing endcapping agents having a terminal portion reactive with an amine or isocyanate and a terminal portion that is non-functional or that can react under moisture-cure or free-radical conditions; with the provisos (1) that if no polydiorganosiloxane monoamine is present, then at least one polyamine is present, wherein polyamine comprises at least one polydiorganosilxane diamine or mixtures of at least one polydiorganosilxane diamine and at least one organic polyamine, (2) if only polyisocyanate and polyamine are present, the molar ratio of isocyanate to amine is <0.9:1 or >1.1:1, and (3) when polydiorganosiloxane monoamine and diamine are present, the ratio of total isocyanate available in the polyisocyanate to the total amine available in the monoamine and diamine less any amine end groups in the copolymer is about 1:1; and (c) solvent to a reactor;

mixing the reactants in the reactor;

allowing the reactants to react to form a polydiorganosiloxane oligourea segmented copolymer with an average degree of oligomerization of 2 to 12; and conveying the oligomer from the reactor.

The solventless process comprises the steps of:

continuously providing (a) a polyisocyanate; (b) an endcapping agent selected from polydiorganosiloxane monoamines and non-siloxane containing endcapping agents having a terminal portion reactive with an amine or isocyanate and a terminal portion that is non-functional or that can react under moisture-cure or free-radical conditions;

with the provisos (1) that if no polydiorganosiloxane monoamine is present, then at least one polyamine is present, wherein polyamine comprises at least one polydiorganosiloxane diamine or a mixture of at least one polydiorganosiloxane diamine and at least one organic polyamine, (2) if only polyisocyanate and polyamine are present, the molar ratio of isocyanate to amine is <0.9:1 or >1.1:1, and (3) when polydiorganosiloxane monoamine and diamine are present, the ratio of total isocyanate available in the polyisocyanate to the total amine available in the monoamine and diamine less any amine end groups in the copolymer is about 1:1, to a reactor under substantially solventless conditions;

mixing the reactants in the reactor under the substantially solventless conditions;

allowing the reactants to react to form a polydiorganosiloxane oligourea segmented copolymer with a average degree of oligomerization of 2 to 12; and conveying the oligomer from the reactor.

In the solventless process, generally, no solvent is needed to carry out the reaction, making the process more environmentally friendly than the solvent process for making polydiorganosiloxane oligourea segmented copolymers. Small amounts of solvent may be present, if necessary, to control the flow of solid polyisocyanates, high viscosity polyisocyanates, low amounts of polyisocyanates, or for controlled addition of adjuvants such as tackifying resins, pigments, crosslinking agents, plasticizers, fillers, and stabilizing agents, or to reduce their viscosity. An additional benefit of the continuous, solventless process of the present invention is the ability to extrude the polydiorganosiloxane polyurea segmented oligomer into thick constructions, into patterned shapes or onto irregularly-shaped surfaces directly after polymerization.

DESCRIPTION OF THE PREFERRED EMBODIMENT(S)

Different polyisocyanates in the reaction will modify the properties of the polydiorganosiloxane oligourea segmented copolymer. For example, if a polycarbodiimide-modified diphenylmethane diisocyanate, such as ISONATE™ 143L, available from Dow Chemical Co., is used, the resulting polydiorganosiloxane oligourea segmented copolymer has superior solvent resistance when compared with other polyisocyanates. If tetramethyl-m-xylylene diisocyanate is used, the resulting segmented copolymer may be a semisolid to solid gel that has a very low melt viscosity that makes it particularly useful in potting and sealant applications where thermal reversibility is advantageous.

Any diisocyanate that can be represented by the formula

OCN—Z—NCO wherein Z is as defined above, can be used in the present invention. Examples of such diisocyanates include, but are not limited to, aromatic diisocyanates, such as 2,6-toluene diisocyanate, 2,5-toluene diisocyanate, 2,4-toluene diisocyanate, m-phenylene diisocyanate, p-phenylene diisocyanate, methylene bis(o-chlorophenyl diisocyanate), methylenediphenylene-4,4'-diisocyanate, polycarbodiimide-modified methylenediphenylene diisocyanate, (4,4'-diisocyanato-3,3',5, 5'-tetraethyl) biphenylmethane, 4,4'-diisocyanato-3,3'-dimethoxybiphenyl (o-dianisidine diisocyanate), 5-chloro-2,4-toluene diisocyanate, 1-chloromethyl-2,4-diisocyanato benzene, aromatic-aliphatic diisocyanates such as m-xylylene diisocyanate, tetramethyl-m-xylylene diisocyanate, aliphatic diisocyanates, such as 1,4-diisocyanatobutane, 1,6-diisocyanatohexane, 2,2,4-trimethylhexyl diisocyanate, 1,12-diisocyanatododecane, 2-methyl-1,5-diisocyanatopentane, and cycloaliphatic diisocyanates such as methylene-dicyclohexylene-4,4'-diisocyanate, and 3-isocyanatomethyl-3,5,5-trimethyl-cyclohexyl isocyanate and mixtures thereof.

Preferred diisocyanates include 2,6-toluene diisocyanate, methylenediphenylene-4,4'-diisocyanate, polycarbodiimide-modified methylenediphenyl diisocyanate, o-dianisidine diisocyanate, tetramethyl-m-xylylene diisocyanate, methylenedicyclohexylene-4,4'-diisocyanate, 3-isocyanatomethyl-3,5,5-trimethylcyclohexyl isocyanate (isophorone diisocyanate), 2,2,4-trimethylhexyl diisocyanate, 1,6-diisocyanatohexane, and cyclohexylene-1,4-diisocyanate. Particularly preferred is tetramethyl-m-xylylene diisocyanate and mixtures thereof.

Any triisocyanate that can react with a monoamine and polyamine can be used in the present invention. Examples of such triisocyanates include, but are not limited to, polyfunctional isocyanates, such as those produced from biurets, isocyanurates, adducts, and the like, may be used. Some commercially available polyisocyanates include portions of the DESMODUR™ and MONDUR™ series from Bayer and the PAPI series of Dow Plastics.

Preferred triisocyanates include DESMODUR™ N-3300 and MONDUR™ 489.

Terminal Groups

Polydiorganosiloxane monoamines useful in the present invention as end capping agents can be represented by the formula

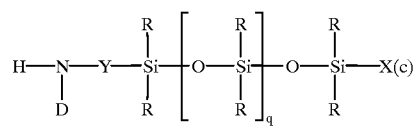

where D, R, X(c), Y and q are as described above, and include those having number average molecular weights in the range of about 700 to 150,000. Preferred are polydiorganosiloxane monoamines prepared as deescribed in U.S. Pat. No. 5,091,483, wherein such description is incorporated herein by reference. The polydiorganosiloxane monoamines can be prepared, for example, from the reaction of cyclic organotrisiloxanes with alkyl lithium reagents in tetrahydrofuran to yield lithium polydiorganosiloxanolates that are subsequently reacted with aminoalkylfluorosilanes as terminating agents to provide the polydiorganosiloxane monoamine product.

Examples of siloxane monoamines useful in the present invention include polydimethylsiloxane monoamine, polydiphenylsiloxane monoamine, polytrifluoropropylmethylsiloxane monoamine, polyphenylmethylsiloxane monoamine, polydiethylsiloxane monoamine, polydivinylsiloxane monoamine, polyvinylmethylsiloxane monoamine, and copolymers thereof and mixtures thereof.

Suitable endcapping agents for polydiorganosiloxane oligourea segmented copolymers that would be terminated with amine groups, were no endcapping agent present, and that provide terminal groups that are not reactive under moisture curing or free radical curing conditions include but are not limited to monoisocyanates such as alkyl isocyanates, such as benzyl isocyanate, cyclohexyl isocyanate, n-dodecyl isocyanate, n-octadecyl isocyanate, octyl isocyanate, 2-phenylethyl isocyanate, trimethylsilyl isocyanate, undecyl isocyanate; and aryl isocyanates, such as 4-bromophenyl isocyanate, 2-chlorophenyl isocyanate, 2,4-dimethylphenyl isocyanate, 1-naphthyl isocyanate, phenyl isocyanate, 4-tolyl isocyanate, 4-trifluoromethylphenyl isocyanate, 2,4,6-trimethylphenyl isocyanate.

Suitable endcapping agents for polydiorganosiloxane oligourea segmented copolymers that would be terminated with isocyanate groups, were no endcapping agent present, and provide terminal groups that are not reactive under moisture curing or free radical curing conditions include but are not limited to organic monoamines such as propylamine, cyclohexylamine, aniline, benzylamine, octadecylamine, phenylethylamine, and polyoxyalkylene monoamine, such as those that can be obtained from Huntsman, Corp. under the tradename of Jeffamine, polyethylene oxide, polypropylene oxide, copolymers thereof and mixtures thereof.

Suitable endcapping agents for polydiorganosiloxane oligourea segmented copolymers that would be terminated with amine groups, were no endcapping agent present, and that provide terminal groups that are reactive under free radical curing conditions, include but are not limited to isocyanatoethyl methacrylate; alkenyl azlactones such as vinyl dimethyl azlactone and isopropenyl dimethyl azlactone, m-isopropenyl-α,α-dimethyl benzyl isocyanate, and acryloyl ethyl carbonic anhydride. Some endcapping agents that can react with amine groups, e.g., isocyanatoethyl methacrylate, are commercially available, and others can be prepared using known methods. Alkenyl azlactones and their preparations are described, for example, in U.S. Pat. No. 4,777,276, wherein such description is incorporated herein by reference. Acryloyl ethyl carbonic anhydride can be prepared from ethyl chloroformate and acrylic acid as described in R. Hatada et al., *Bull. Chem. Soc, Japan,* 41 (10), 2521 (1968). Preferred endcapping agents for polydiorganosiloxane oligourea segmented copolymers that would be amine terminated if no endcapping agent were present include, for example, isocyanatoethyl methacrylate, vinyl dimethyl azlactone, and acryloyl ethyl carbonic anhydride.

Suitable endcapping agents for polydiorganosiloxane oligourea segmented copolymers that would be amine terminated, if no endcapping agent were present, to provide terminal groups that are reactive under nmoisture curing conditions include but are not limited to isocyanatopropyl trimethoxysilane, isocyanatopropyl triethoxysilane, isocyanatopropyl dimethoxy (methylethylketoximino)silane, isocyanatopropyl diethoxy (methylethylketoximino)silane, isocyanatopropyl monomethoxy di(methylethylketoximino)silane, isocyanatopropyl monoethoxy di(methylethylketoximino)silane, and isocyanatopropyl tri (methylethylketoximino)silane. Polyisocyanates that serve to form the copolymer, may also serve as the moisture curable terminal portion of the copolymer when the number of isocyanate groups provided by the polyisocyanates exceed the amine groups provided by the polyamines. Polymers prepared with such end-capping agents can be further reacted to provide higher molecular weight polymers or copolymers.

Suitable endcappiug agents for polydiorganosiloxane oligourea segmented copolymers that would be isocyanate terminated if no endcapping agent were present to provide terminal groups that are reactive under moisture curing conditions include but are not limited by aminopropyl trimethoxysilane, aminopropyl triethoxysilane, aminopropyl methyldimethoxysilane, aminopropyl methyldiethoxysilane, aminopropyl dimethoxy (methylethylketoximino)silane, aminopropyl diethoxy (methylethylketoximino)silane, aminopropyl monomethoxydi(methylethylketoximino)silane, aminopropyl monoethoxydi(methylethylketoximino)silane, and aminopropyl tri(methylethylketoximino)silane mixtures thereof and partial hydrolyzates thereof. Preferred endcapping agents, for isocyanate-terminated polydiorganosiloxane polyurea segmented oligomers, if no end-capping agents were present to provide terminal groups that are reactive under various conditions, include those selected from the group consisting of aminopropyl trimethoxysilane, aminopropyl triethoxysilane and aminopropyl methyldiethoxysilane.

Polydiorganosiloxane diamines useful in the present invention can be represented by the formula

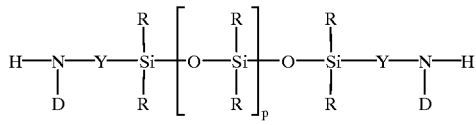

R, Y, D and p are defined as above and includes those having number average molecular weights in the range of about 700 to 150,000.

Preferred diamines are substantially pure polydiorganosiloxane diamines prepared as described in U.S. Pat. No. 5,214,119, wherein such description is incorporated herein by reference. High purity polydiorganosiloxane diamines are prepared from the reaction of cyclic organosiloxanes and bis(aminoalkyl)disiloxanes utilizing an anhydrous amino alkyl functional silanolate catalyst such as tetramethylammonium 3-aminopropyldimethylsilanolate, preferably in an amount less than 0.15 weight percent based on the total weight of the cyclic organosiloxanes with the reaction run in two stages.

Particularly preferred are polydiorganosiloxane diamines prepared using cesium and rubidium catalysts.

Preparation includes combining under reaction conditions (1) an amine functional end-capping agent represented by the formula:

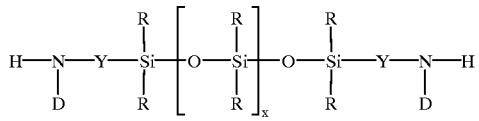

wherein each R, Y, D andp are defined as above and x is an integer of about 0 to 150;

(2) sufficient cyclic siloxane to obtain a polydiorganosiloxane diamine having a molecular weight greater than the molecular weight of the end-capping agent and (3) a catalytically effective amount of cesium hydroxide, rubidium hydroxide, cesium silanolate, rubidium silanolate, cesium polysiloxanolate, rubidium polysiloxanolate, and mixtures thereof.

The reaction is continued until substantially all of the amine functional end-capping agent is consumed. Then the reaction is terminated by adding a volatile organic acid to form a mixture of a polydiorganosiloxane diamine usually having greater than about 0.01 weight percent silanol impurities and one or more of the following, a cesium salt of the organic acid, a rubidium salt of the organic acid, or both such that there is a small molar excess of organic acid in relation to catalyst. Then, the silanol groups of the reaction product are condensed under reaction conditions to form polydiorganosiloxane diamine having less than or equal to about 0.01 weight percent silanol impurities while the unreacted cyclic siloxane is stripped, and, optionally, the salt is removed by subsequent filtration.

Examples of polydiorganosiloxane diamines useful in the present invention include polydimethylsiloxane diamine, polydiphenylsiloxane diamine, polytrifluoropropylmethylsiloxane diamine, polyphenylmethylsiloxane diamine, polydiethylsiloxane diamine, polydivinylsiloxane diamine, polyvinylmethylsiloxane diamine, poly(5-hexenyl) methylsiloxane diamine, mixtures and copolymers thereof.

Examples of organic polyamines useful in the present invention include but are not limited to polyoxyalkylene diamine, such as D-230, D-400, D-2000, D-4000, DU-700, ED-2001 and EDR-148, all available from Huntsman, polyoxyalkylene triamine, such as T-3000 and T-5000 available from Huntsman, polyalkylenes, such as Dytek A and Dytek EP, available from DuPont.

The above polyamines, polyisocyanates, and endcapping agents are used in the appropriate stoichiometric ratios to obtain curable polydiorganosiloxane oligourea segmented copolymers with the desired average degree of polymerization.

Silane agents may be used to crosslink the moisture curable polysiloxane oligourea segmented copolymers of the present invention. Suitable silane agents generally have the formula $R''_n SiW_{4-n}$ where $R''$ is a monovalent hydrocarbon group, (for example, an alkyl, alkylenyl, aryl, or alkaryl group), n is 0, 1 or 2, and W is a monovalent hydrolyzable group such as a dialkylketoximino group, (for example, methylethylketoximino, dimethylketoximino, or diethylketoximino), alkoxy group (for example, methoxy, ethoxy, or butoxy), alkenoxy group (for example, isopropenoxy), acyloxy group (for example, acetoxy), alkamido group (for example, methylacetamido or ethylacetamido), or acylamido group (for example, phthalimidoamido). Silane crosslinking agents falling within this category are commercially available, for example, from Silar Laboratories, Scotia, N.Y. Particularly preferred silane crosslinking agents are dialkylketoximinosilanes because they exhibit good shelf-stability and do not form deleterious by-products upon cure. Examples include methyltri(methylethylketoximino) silane and vinyltri (methylethylketoximino) silane, both of which are commercially available from Allied-Signal, Inc. Morristown, N.J., and alkoxysilanes available from OSi Chemicals, Lisle, Ill.

The free radically curable polydiorganosiloxane oligourea segmented copolymer compositions of the invention can, depending upon their viscosity, be coated, extruded, or poured, and rapidly, completely, and reliably radiation cured to elastomers (even at high molecular weight) by exposure to electron beam, visible or ultraviolet radiation. Curing should be carried out in as oxygen-free an environment as possible, e.g., in an inert atmosphere such as nitrogen gas or by utilizing a barrier of radiation-transparent material having low oxygen permeability. Curing can also be carried out under an inerting fluid such as water. When visible or ultraviolet radiation is used for curing, the silicone compositions may also contain at least one photoinitiator. Suitable photoinitiators include benzoin ethers, benzophenone and derivatives thereof, acetophenone derivatives, camphorquinone, and the like. Photoinitiator is generally used at a concentration of from about 0.1% to about 5% by weight of the total polymerizable composition, and, if curing is carried out under an inerting fluid, the fluid is preferably saturated with the photoinitiator or photoinitiators being utilized in order to avoid the leaching of initiator from the silicone composition. The rapid cure observed for these materials allows for the use of very low levels of photoinitiator relative to what is known in the art, hence uniform cure of thick sections can be achieved due to deeper penetration of radiation. If desired, the silicone compositions of this invention can also be cured thermally, requiring the use of thermal initiator such as peroxides, azo compounds, or persulfates generally at a concentration of from about 1% to about 5% by weight of the total polymerizable composition. Preferably any thermal or photo-initiator used is soluble in the silicone compositions themselves, requiring little or no use of a solvent to dissolve the initiator.

Examples of suitable curing catalysts for moisture curable polydiorganosiloxane oligourea segmented copolymers include alkyl tin derivatives (e.g., dibutyltindilaurate, dibutyltindiacetate, and dibutyltindioctoate commercially available as "T-series Catalysts" from Air Products and Chemicals, Inc. of Allentown, Pa.), and alkyl titanates (e.g., tetraisobutylorthotitanate, titanium acetylacetonate, and acetoacetic ester titanate commercially available from DuPont under the designation "TYZOR"). In general, however, it is preferred to select silane crosslinking agents that do not require the use of curing catalysts to avoid reducing shelf-life and adversely affecting the physical properties of the composition.

Other catalysts useful for moisture curable polydiorganosiloxane oligourea segmented copolymers include acids, anhydrides, and lower alkyl ammonium salts thereof that include but are not limited to those selected from the group consisting of trichloroacetic acid, cyanoacetic acid, malonic acid, nitroacetic acid, dichloroacetic acid, difluoroacetic acid, trichloroacetic anhydride, dichloroacetic anhydride, difluoroacetic anhydride, triethylammonium trichloroacetate, trimethylammonium trichloroacetate, and mixtures thereof.

Also useful for curing compositions of this invention are the well known two component room temperature free radical curatives consisting of a polymerization catalyst and an accelerator. Common polymerization catalysts useful in this two component curative include organic peroxides and hydroperoxides such as dibenzoyl peroxide, t-butyl hydroperoxide, and cumene hydroperoxide, that are not active at room temperature in the absence of an accelerator. The accelerator component of the curative consists of the condensation reaction product of a primary or secondary amine and an aldehyde. Common accelerators of this type are butyraldehyde-aniline and butyraldehyde-butylamine condensation products sold by E. I. duPont de Nemours & Co. as Accelerator 808™ and Accelerator 833™. This catalyst system may be employed to prepare a two-part free radically curable organosiloxane oligourea segmented copolymer where the curable copolymrer is divided into two parts and to one part is added the polymerization catalyst and to the other part is added the accelerator. Upon mixing this two component system cures at room temperature. Alternatively, the polymerization catalyst can be incorporated in the free radically curable organosiloxane oligourea segmented copolymer and the accelerator can be applied to a substrate such that when the free radically curable organosiloxane oligourea segmented copolymer containing polymerization catalyst contacts the "primed" substrate surface, cure proceeds immediately at room temperature. Those of ordinary skill in the art are familiar with such cure systems and could readily adapt them to various product constructions.

Fillers, tackifying resins, plasticizers, and other property modifiers may be incorporated in the polydiorganosiloxane polyurea segmented oligomers of the present invention. Generally, such modifiers are used in amounts ranging up to about 80 weight percent. Additives such as dyes, pigments, stabilizers, antioxidants, compatibilizers, and the like can also be incorporated into the polydiorganosiloxane polyurea segmented copolymers of the invention. Generally, such additives are used in amounts ranging up to about 20 weight percent.

Specific characteristics of the polydiorganosiloxane oligourea segmented copolymers of the invention can be influenced by a number of factors including 1) the nature of the "K" group, when present, 2) the nature of the diisocyanate group used, 3) the molecular weight of the polydiorganosiloxane monoamine and/or polydiorganosiloxane diamine used, 4) the presence of an organic polyamine, 5) the average degree of oligomerization, and 6) whether significant excesses of polyisocyanate or polyamine exist. The nature of the "K" group largely determines whether or not the copolymer is curable, by what mechanism, and under what conditions.

The nature of the isocyanate residue in the polydiorganosiloxane oligourea segmented copolymer influences stiffness and flow properties, and also affects the properties of the cured copolymers. Isocyanate residues resulting from diisocyanates that form crystallizable ureas, such as tetramethyl-m-xylylene diisocyanate, 1,12-dodecane diisocyanate, dianisidine diisocyanate, provide copolymers that are stiffer than those prepared from methylenedicyclohexylene-4,4'-diisocyanate, 3-isocyanatomethyl-3,5,5-trimethylcyclohexyl isocyanate, and m-xylylene diisocyanate.

The molecular weight of the polydiorganosiloxane monoamine or diamine, if present, affects the elasticity of the polydiorganosiloxane oligourea segmented copolymers. Lower molecular weight diamines result in polydiorganosiloxane oligourea segmented copolymers having higher modulus and higher tensile strength when cured. Higher molecular weight diamines provide copolymers having lower modulus but higher strain at break. The average degree of oligomerization affects the rheological properties of the uncured oligomer and may affect the mechanical properties of the cured oligomer. The average degree of oligomerization affects the rheological properties with increasing degrees of oligomerization. Excess polyisocyanate or polyamine may affect the reactivity of the oligomer with other reactive moieties.

The materials of the invention can be made by a solvent process and by a solventless process. In both processes of the present invention, the reactants and optional nonreactive additives are mixed in a reactor and allowed to react to form the polydiorganosiloxane polyurea segmented oligomers having an average degree of oligomerization of from 2 to 12 and that can then be removed from the reaction vessel. When isocyanate functional endcapping agents are utilized, such agents can, for example, be mixed with the other isocyanate reactants before they are introduced into the reactor. Similarly, amine-functional endcapping agents for example, may be mixed with polydiorganosiloxane diamine reactants before they are introduced into the reactor.

In the following discussion of the two processes, an isocyanate functional endcapping agent, different from the diisocyanate reactant, is utilized.

For the solvent based process, the reaction solvents and starting materials are usually purified and dried and the reaction is carried out under an inert atmosphere such as dry nitrogen or argon.

The preferred reaction solvents are those that are unreactive with the isocyanate functional reactants, the amine functional reactants and the endcapping agents and that maintain the reactants and product completely in solution throughout the polymerization reaction. Generally, chlorinated solvents, ethers, and alcohols are preferred with aliphatic diisocyanates, with methylene chloride, tetrahydrofuran, and isopropyl alcohol being particularly preferred. When reactants include aromatic diisocyanates such as methylenediphenylene-4,4'-diisocyanate (MDI), a mixture of tetrahydrofuran with 10% to 25% by weight of dipolar aprotic solvent such as dimethylformamide is preferred.

In the substantially solventless process, the flexibility of the process leads to interesting materials. One skilled in the art can expect the optimum material for a particular application to be a function of the architecture and ratios of reactants, mixing speed, temperature, reactor throughput, reactor configuration and size, residence time, residence time distribution, optionai initiator architecture, and whether any fillers, additives, or property modifiers are added.

Any reactor that can provide intimate mixing of the polyisocyanates and polyamines is suitable for use in substantially solventless process of the present invention. The reaction may be carried out as a batch process using, for example, a flask equipped with a mechanical stirrer, provided the product of the reaction has a sufficiently low viscosity at the processing temperature to permit mixing, or as a continuous process using, for example a single screw or twin screw extruder. Preferably, the reactor is a wiped surface counter-rotating or co-rotating twin screw extruder.

Temperatures in the reactor should be sufficient to permit reaction between the polyisocyanate and the polyamine to occur. The temperature should be sufficient to permit conveying of the materials through the reactor, and any subsequent processing equipment such as, for example, feedblocks and dies. For conveying the reacted material, the temperature should preferably be in the range of about 20 to 250° C., more preferably in the range of about 20 to 200° C. Residence time in the reactor typically varies from about 5 seconds to 8 minutes, more typically from about 15 seconds to 3 minutes.

The residence time depends on several parameters, including, for example, the length to diameter ratio of the reactor, mixing rates, overall flowrates, reactants, and the need to blend in additional materials. For materials involving reaction with minimal or no blending of a nonreactive component, the reaction can easily take place in as little as 5:1 length to diameter units of a twin screw extruder.

When a wiped surface reactor is used, it preferably has relatively close clearances between the screw flight lands and the barrel, with this value typically lying between 0.1 to about 2 mm. The screws utilized are preferably fully or partially intermeshing or fully or partially wiped in the zones where a substantial portion of the reaction takes place.

Because of the rapid reaction that occurs between the polyisocyanates and polyamines, the materials are preferably fed into an extuder at unvarying rates, particularly when using higher molecular weight polydiorganosiloxane amines, i.e., with number average molecular weights of about 50,000 and higher. Such feeding generally reduces undesirable variability of the final product.

One method of ensuring the continuous feeding of very low flow polyisocyanate quantities in an extruder is to first mix the endcapping agent with the polyisocyanate and then to allow the polyisocyanate and isocyanate-functional endcapping agent feed line to touch or very nearly touch the passing threads of the screws. Another method would be to utilize a continuous spray injection device that produces a continuous stream of fine droplets of the polyisocyanate and isocyanate-functional endcapping agent into the reactor.

However, the various reactants and additives can be added in any order provided the addition of an additive does not interfere with the reaction of the reactants. An additive that is particularly reactive with a polyisocyanate reactant typically would not be added until after the reaction of the polyisocyanate with a polyamine reactant. Further, the reactants can be added simultaneously or sequentially into the reactor and in any sequential order, for example, the polyisocyanate stream can be the first component added into the reactor in a manner such as mentioned above. Polyamine can then be added downstream in the reactor. Alternately, the polyisocyanate stream can also be added after the polyamine has been introduced into the reactor.

The process of the present invention has several advantages over conventional solution polymerization processes for making polydiorganosiloxane polyurea segmented copolymers such as (1) the ability to vary the polyisocyanate-to-polyamine ratio to obtain materials with properties superior to solution polymerized materials, (2) the capabiility of polymerizing high molecular weight compositions that cannot be easily produced using solution polymerization, (3) the ability to directly produce shaped articles with reduced heat histories, (4) the ability to directly blend in fillers, tackifying resins, plasticizers, and other property modifiers, and (5) the elimination of solvent.

The flexibility of altering the polyisocyanate-to-polyamine ratio in the continuous process is a distinct advantage. This ratio can be varied above and below the theoretical value of 1:1 quite easily.

The polyisocyanate and isocyanate-functional endcapping agent stream can be the first component added into the reactor in a manner such as mentioned above. The polydiorganosiloxane amine can then be added downstream in the reactor. Alternately, the diisocyanate and isocyanate functional endcapping agent stream can also be added after the polydiorganosiloxane amine stream has been introduced into the reactor.

In formulating the polydiorganosiloxane oligourea segmented copolymers with components such as tackifying resins, inorganic fillers, plasticizers or other materials essentially non-reactive with the polydiorganosiloxane polyurea segmented oligomer reactants, the materials to be blended can be added further downstream in the reactor after a substantial portion of the reaction of the diisocyanate, the polydiorganosiloxane amine, and the isocyanate functional endcapping agent has taken place. Another suitable order of addition is addition of the polydiorganosiloxane amine first, the additive second, and the diisocyanate and isocyanate functional endcapping agent third, with the diisocyanate and the endcapping agent fed in a continuous manner. If the additive can be conveyed in the reactor, it can be added into the reactor first with the polydiorganosiloxane amine, diisocyanate, and isocyanate functional endcapping agent following separately at later stages in the process.

The substantially solventless process of the present invention has several advantages over conventional solution polymerization processes for making polydiorganosiloxane oligourea segmented copolymers such as the ability to directly produce shaped articles with reduced heat histories, the ability to directly blend in fillers, tackifying resins, and other property modifiers, and the elimination of solvent. Because the polydiorganosiloxane oligourea segmented copolymers of this invention typically have low melt viscosities, they can be processed at lower temperature than can fully chain extended analogs.

In general, long exposure to heat would be expected to degrade polydiorganosiloxane oligourea segmented copolymoers and leads to a degradation of physical properties. The degradation experienced by certain solution polymerized polydiorganosiloxane oligourea segmented copolymers upon drying and subsequent hot melt extrusion is also overcome by the continuous process of the present invention because reactively extruded polydiorganosiloxane oligourea segmented copolymers can be extruded directly from the polymerization zone through a die to form shaped articles such as tubing and films without the additional heat history associated with solvent removal and the subsequent oligomer reheating.

The ability to eliminate the presence of solvent during the reaction of the diisocyanate, the endcapping agent and the optional polydiorganosiloxane di or mono amine yields a much more efficient reaction. The average residence time using the process of the present invention is typically 10 to 1000 times shorter than that required in solution polymerization. A small amount of solvent can be added, if necessary, e.g., from about 0.5% up to about 5% of the total composition, in this process either as a carrier for injecting otherwise solid materials or in order to increase stability of an otherwise low flowrate stream of material into the reaction chamber.

While the continuous solventless process for making the copolymers has many advantages over the solvent process, there may be some situations where the solvent process is preferred or where a combination of the two is preferred. In the later case, polydiorganosiloxane oligourea segmented copolymer could be made by the continuous process and subsequently mixed in solvent with thermal initiators, photoinitiators, tackifying resins, plasticizers and/or filler components.

The ability to eliminate the presence of solvent during the reaction of polyamine and polyisocyanate yields a much more efficient reaction. The average residence time using the process of the present invention is typically 10 to 1000 times shorter than that required in solution polymerization. A small amount of non-reactive solvent can be added, if necessary, for example, from about 0.5% up to about 5% of the total composition, in this process either as a carrier for injecting otherwise solid materials or in order to increase stability of an otherwise low flowrate stream of material into the reaction chamber.

This invention is further illustrated by the following examples that are not intended to limit the scope of the invention. In the examples all parts and percentages are by weight unless otherwise indicated. All molecular weights reported are number average molecular weights in grams/mol.

Titration of Polydiorganosiloxane and Organic Diamines

Multiple lots of some of the diamines were synthesized for various examples. The actual number average molecular weight of polydiorganosiloxane or organic diamines were determined by the following acid titration. Sufficient diamine to yield about 1 milliequivalent of amine is dissolved in 50/50 tetrahydrofuran/isopropyl alcohol to form a 10% solution. This solution was titrated with 1.0N hydrochloric acid with bromophenyl blue as an indicator to determine number average molecular weight The molecular weights are dependent on the exact ratio of the reactants used in the diamine synthesis and the extent of stripping cyclic siloxanes. Remaining cyclics are diluents that increase the apparent molecular weight of polydiorganosiloxane diamine.

Preparation of Polydiorganosiloxane Diamines

Polydimethylsiloxane Diamine A

A mixture of 4.32 parts bis(3-aminopropyl)tetramethyl disiloxane and 95.68 parts octamethylcyclotetrasiloxane, was placed in a batch reactor and purged with nitrogen for 20 minutes. The mixture was then heated in the reactor to 150° C. Catalyst, 100 ppm of 50% aqueous cesium hydroxide, was added and heating continued for 6 hours until the bis(3-aminopropyl) tetramethyl disiloxane had been consumed. The reaction mixture was cooled to 90° C., neutralized with excess acetic acid in the presence of some triethylamine, and heated under high vacuum to remove cyclic siloxanes over a period of at least five hours. The material was cooled to ambient temperature, filtered to remove any cesium acetate that had formed, and titrated with 1.0N hydrochloric acid to determine number average molecular weight. Two lots were prepared and the molecular weights of Polydimethylsiloxane Diamine A were Lot 1:5280 and Lot 2:5310.

Polydimethylsiloxane Diamine B

Polydimethylsiloxane diamine was prepared as described for Polydimethylsiloxane Diamine A except 2.16 parts bis (3-aminopropyl)tetramethyl disiloxane and 97.84 parts octamethylcyclotetrasiloxane were used. Two lots were prepared. The molecular weight of Polydimethylsiloxane Diamine B was 10,700.

Polydimethylsiloxane Diamine C

A mixture of 21.75 parts Polydimethylsiloxane Diamine A and 78.25 parts octamethylcyclotetrasiloxane was placed in a batch reactor, purged with nitrogen for 20 minutes and then heated in the reactor to 150° C. Catalyst, 100 ppm of 50% aqueous cesium hydroxide, was added and heating continued for 3 hours until equilibrium concentration of cyclic siloxanes was observed by gas chromatography. The reaction mixture was cooled to 90° C., neutralized with excess acetic acid in the presence of some triethylamine, and heated under high vacuum to remove cyclic siloxanes over a period of at least 5 hours. The material was cooled to ambient temperature, filtered, and titrated with 1.0N hydrochloric acid to determine number average molecular weight. The molecular weight of resulting Polydimethylsiloxane Diamine C was 22,300.

Polydimethylsiloxane Diamine D

Polydimethylsiloxane diamine was prepared as described for Polydimethylsiloxane Diamine C except 12.43 parts Polydiorganosiloxane Diamine A and 87.57 parts octamethylcyclotetrasiloxane were used. Two lots were prepared. The molecular weights of the resulting Polydimethylsiloxane Diamine D were Lot 1-35,700 and Lot 2-37,800.

Polydimethylsiloxane Diamine E

Polydimethylsiloxane diamine was prepared as described for Polydimethylsiloxane Diamine C except that 8.7 parts Polydimethylsiloxane Diamine A and 91.3 parts octamethylcyclotetrasiloxane were used. The molecular weight of the thus-produced Polydimethylsiloxane Diamine E was 50,200.

Polydiphenyldimethylsiloxane Diamine F

To a 3-necked round bottom flask fit with mechanical stirrer, static nitrogen atmosphere, oil heating bath, thermometer, and reflux condenser, were added 75.1 parts octamethylcyclotetrasiloxane, 22.43 parts octaphenylcyclotetrasiloxane, and 2.48 parts bis(3-aminopropyl)tetramethyl disiloxane. Under static nitrogen atmosphere, the reactants were heated to 150° C. and degassed under aspirator vacuum for 30 seconds before restoring static nitrogen atmosphere. A charge of 0.2 grams cesium hydroxide solution (50% aqueous) was added to the flask and heating continued for 16 hours at 150° C. The flask was cooled to ambient temperature and then 2 mL triethylamine and 0.38 mL acetic acid were added. With good agitation flask was placed under a vacuum of 100 N/m$^2$ (100 Pa), heated to 150° C., and maintained at 150° C. for 5 hours to remove volatile materials. After 5 hours heat was removed and contents cooled to ambient temperature. The molecular weight of Polydiphenyldimethylsiloxane Diamine F was 9620.

Preparation of Polydimethylsiloxane Monoamines

The following polydimethylsiloxane monoamines were synthesized for various examples according to the procedures of U.S. Pat. No. 5,091,483 Example 6 (terminating agent) and Example 10 (silicone monoamine). The actual number average molecular weight of the different lots are determined by acid titration.

Aminopropyldimethylfluorosilane Terminating Agent

To a 500 mL 3-necked round bottom flask was added 49.6 grams 1,3-bis(3-aminopropyl)tetramethyldisiloxane, 29.6 grams ammonium fluoride, and 300 mL cyclohexane. While heating under reflux, water was removed by means of Dean-Stark trap. After 18 hours, 4.4 mL of water was collected, and the clear, colorless solution was transferred while warm to a 500 mL 1-neck round bottom flask. The solvent was removed on a rotary evaporator to provide 165 grams of white solid. The solid was dissolved in 200 ml methylene chloride, 30 grams of hexamethyl disilazane was added, and the mixture was stirred and heated under reflux for 5 hours. The mixture was filtered and the solvent removed under aspirator vacuum. The product was distilled (boiling point of 70° C.) under aspirator vacuum to provide 3aminopropyldimethylfluorosilane as a clear, colorless oil. The yield was 54 grams (100%), that was determined to be pure by vapor phase chromatography. The structure was confirmed by NMR spectroscopy.

Polydimethylsiloxane Monoamine A

To 1.6 parts of 2.5 M n-butyl lithium were added 7.4 parts of octamethylcyclotetrasiloxane that had been purged with argon and the mixture was then stirred for 30 minutes; 500 parts of 50% hexamethylcyclotrisiloxane in dry tetrahydrofuran was added and the reaction mixture stirred at room temperature for 18 hours until the polymerization was complete. To the resulting viscous syrup was added 3.4 parts 3-aminopropyldimethylfluorosilane terminating agent. The viscosity rapidly decreased. After stirring for 2 hours, the solvent was distilled off on a rotary evaporator. The product was filtered to remove lithium fluoride and provided Polydimethylsiloxane Monoamine A as a clear, colorless oil. The number average molecular weight of Polydimethylsiloxane Monoamine A was 9800.

Polydimethylsiloxane Monoamine B

To 1.6 parts of 2.5 M n-butyl lithium were added 7.4 parts of octamethylcyclotetrasiloxane that had been purged with argon and the mixture was then stirred for 30 minutes; 1000 parts of 50% hexamethylcyclotrisiloxane in dry tetrahydrofuran was added and the reaction mixture stirred at room temperature for 18 hours until polymerization was complete. To the resulting viscous syrup was added 3.4 parts 3-aminopropyldimethylfluorosilane terminating agent. The viscosity rapidly decreased. After stirring for 2 hours, the solvent was distilled off on a rotary evaporator. The product was filtered to remove lithium fluoride and provided 500 Polydimethylsiloxane Monoamine B as a clear, colorless oil. The number average molecular weight was 20,600.

Polydimethylsiloxane Monoamine C

To 588 grams (2.64 mol) hexamethylcyclotrisiloxane which had been degassed via boiling then cooled to room temperature was added 500 mL dry tetrahydrofuran. To this solution was added 19.3 mL (0.05 mol) of 2.59 M n-butyl lithium and the reaction mixture stirred at room temperature for 6.5 hours until the polymerization was complete. To the resulting viscous syrup was added 23.2 mL (0.06 mol) of 2.58M 3-aminopropyldimethyl fluorosilane terminating agent. After stirring overnight the solvent and remaining hexamethylcyclotrisiloxane were distilled off on a rotary evaporator to afford the Polydimethylsiloxane Monoamine C as a clear, colorless oil. The number average molecular weight of Polydimethylsiloxane Monoamine C was 12,121.

The following test methods were used to characterize the polydiorganosiloxane oligourea segmented copolymers produced in the following examples:

Sample Characterization

Characterization of Uncured Samples

Rheological properties of the uncured materials were determined using Rheometrics, RDA II Rheometer using dynamic temperature ramp mode (−30° C.−175° C.) at a ramp rate of 5° C., 25 mm parallel plates, a strain of 2.0% and a frequency of 10.0 rad/s. Sample thickness was 1–2 mm.

The storage modulus, G', represents that portion of the mechanical energy that is stored, i.e., completely recoverable, when the viscoelastic material undergoes cyclic deformation. The stored energy is analogous to that seen in a simple spring going through cyclic deformation.

The loss modulus, G", represents that portion of the mechanical energy dissipated, i.e., converted to heat, when the viscoelastic material undergoes cyclic deformation. The dissipated energy is analogous to that seen in a simple dashpot going through cyclic deformation.

Stress Rheometer, Rheometrics, DSR, was used to characterize shear creep viscosities of the uncured materials in step stress (creep) mode with 25 mm parallel plates.

Characterization of Cured Samples

Free-radically curable materials were squeezed between two polyester films to a thickness of approximately 1 mm and cured at an intensity of 1.73 mW for a given length of time with low intensity ultraviolet lights. Mechanical properties of the cured samples were characterized as follows:

Mechanical testing was performed on an Instron Model 1122 tensile tester. Testing was performed according to a modification of ASTM D412-83. Samples were prepared according to Method B (cut ring specimens). Type 1 rings (5.1 cm circumference) were produced with a specially-designed precision ring cutter. The Instron analog output signal was routed to a digital voltmeter with accuracy better than 0.5 percent and the digital readings were recorded by a computer. Modifications to the ASTM were as follows:

1. The crosshead speed was 12.7 cm/min rather than 50.8 cm/min.
2. The test fixture shafts (upper and lower jaw) both rotated at 30 RPM in the same direction in order to maintain uniform strain throughout the entire ring.
3. The thickness of the rings was 1 mm.

Molecular Weight

The weight average and number average molecular weights of selected polydimethylsiloxane oligourea segmented copolymers were determined via gel permeation chromatography with a HP 1090 Chromatograph equipped with a HP 1037 A Refractive Index detector, a Waters 590 pump, a Waters Wisp auto-injector, and a Kariba column oven at R.T. The copolymer was dissolved in DMF w/v 0.05% LiBr at 15 mg/5 mL, filtered with a 0.2 micron nylon filter, and 100 microliters injected into a Jordi Mixed Bed column. The elution rate was 0.5 mL/min in DMF+0.05% w/v LiBr. Calibration was based on Polystyrene standards from Pressure Chemical Company, Pittsburgh, Pa. thus reported molecular weights are the Polystyrene equivalents.

EXAMPLES

In the following Examples, all diisocyanates were used as received and the diisocyanate:diamine ratios were calculated using the diisocyanate molecular weight reported by the diisocyanate supplier and the diamine molecular weight as determined by acid titration. In the Examples all parts and percentages are by weight unless otherwise indicated. All molecular weights reported are number average molecular weights in grams/mole.

Examples 1–5

In Example 1, 40.0 parts (4.0 mmoles) of Polydimethylsiloxane Monoamine A, molecular weight 9,800, was degassed under vacuum at 100° C. and 0.49 parts (2.0 mmoles) tetramethyl-m-xylylene diisocyanate in 5.0 parts toluene was added dropwise while stirring. Then 5 mL of 2-propanol was added to reduce the viscosity, and the resulting polydimethylsiloxane oligourea segmented copolymer was poured into a Petri dish and air dried.

In Example 2, a polydimethylsiloxane oligourea segmented copolymer was prepared as in Example 1, except 80.0 parts (3.90 mmoles) of Polydimethylsiloxane Monoamine B, molecular weight 20,600 was substituted for Monoamine A.

In Example 3, a polydimethylsiloxane oligourea segmented copolymer was prepared as in Example 1, except 0.46 parts (2.0 mmoles) of 1,12-diisocyanatododecane was substituted for the tetramethyl-m-xylylene diisocyanate.

In Example 4, a polydimethylsiloxane oligourea segmented copolymer was prepared as in Example 1, except 0.59 parts (2.0 mmoles) 4,4'-diisocyanato-3,3'-dimethoxybiphenyl was substituted for the tetramethyl-m-xylylene diisocyanate.

In Example 5, a polydimethylsiloxane oligourea segmented copolymer was prepared as in Example 1, except 0.52 parts (2.0 mmoles) of methylenedicyclohexylene-4,4'-diisocyanate was substituted for the tetramethyl-m-xylylene diisocyanate and 2-propanol was not added.

The storage modulus, G', the loss modulus, G", the crossover modulus and crossover temperature were determined for the polydimethylsiloxane oligourea segmented copolymers of Examples 1–4, each being gel-like and having an average degree of oligomerization of 2 and being non-functional. The copolymer of Example 5 flowed at room temperature and, thus, had a shear creep viscosity too low to characterize by the method used. The results are set forth in Table 1.

TABLE 1

| Example | G' at 25° C. (Pa) | G" at 25° C. (Pa) | Crossover Modulus (Pa) | Crossover Temp. (° C.) |
|---------|------|------|------|------|
| 1 | $8.0 \times 10^4$ | $0.8 \times 10^4$ | — | ~140 |
| 2 | $10.0 \times 10^4$ | $0.28 \times 10^4$ | — | 100 |
| 3 | $0.3 \times 10^4$ | $0.2 \times 10^4$ | $0.13 \times 10^4$ | 28 |
| 4 | $3.8 \times 10^4$ | $0.08 \times 10^4$ | $0.4 \times 10^4$ | 127 |

The data in Table 1 demonstrates that the polydimethylsiloxane oligourea segmented copolymer prepared using aromatic or aromatic-aliphatic diisocyanates, Examples 1 and 4, had higher storage moduli and crossover temperature than the copolymer prepared using an aliphatic diisocyanate, Example 3. Further, the copolymers vary in storage modulus from $10 \times 10^4$, indicating a firmer gel, to $0.3 \times 10^4$, indicating a very soft gel, to a viscous liquid (Example 5).

Examples 6–10

In Example 6, a mixture of 79 parts (8.0 mmoles) of Polydimethylsiloxane Monoamine A, molecular weight 9,800, and 21 parts (4.0 mmoles) of Polydimethylsiloxane Diamine A, molecular weight 5280, was dissolved in 69 parts toluene and 1.96 parts (8.0 mmoles) of tetramethyl-m-xylylene diisocyanate in 40 parts toluene was added dropwise under agitation at room temperature. The resulting polydimethylsiloxane oligourea segmented copolymer was air dried.

In Example 7, a mixture of 57.9 parts (5.9 mmoles) of Polydimethylsiloxane Monoamine A, molecular weight 9,800, and 15.6 parts (2.95 mmoles) of Polydimethylsiloxane Diamine A, molecular weight 5280, was dissolved in 75 parts toluene and 1.54 parts (5.9 mmoles) of methylenedicyclohexylene-4,4'-diisocyanate in 25 parts toluene was added dropwise under agitation at room temperature The resulting polydimethylsiloxane oligourea segmented copolymer was air dried.

In Example 8, a polydimethylsiloxane oligourea segmented copolymer was prepared as in Example 6, except 1.98 parts (7.9 mmoles) of 1,12-diisocyanatododecane was substituted for the tetramethyl-m-xylylene diisocyanate.

In Example 9, a mixture of 87.8 parts (4.25 mmoles) of Polydimethylsiloxane Monoamine B, molecular weight 20,600 and 11.2 parts (2.12 mmoles) of Polydimethylsiloxane Diamine A, molecular weight 5280, was dissolved in 52 parts toluene and 1.04 parts (4.25 mmoles) of tetramethyl-m-xylylene diisocyanate in 34 parts toluene was added dropwise under agitation at room temperature. The resulting polydimethylsiloxane oligourea segmented copolymer was air dried.

In Example 10, a mixture of 65.8 parts (3.19 mmoles) of Polydimethylsiloxane Monoamine B, molecular weight 20,800, and 8.4 parts (1.59 mmoles) of Polydimethylsiloxane Diamine A molecular weight 5280, was dissolved in 96 parts toluene and 0.80 parts (3.18 mmoles) of 1,12-diisocyanatododecane diisocyanate in 22 parts toluene was added dropwise under agitation at room temperature. The resulting polydimethylsiloxane oligourea segmented copolymer was air dried.

The polydimethylsiloxane oligourea segmented copolymers of each of Examples 6–10 had an average degree of oligomerization of 3. The copolymers of Examples 6, 8, 9 and 10 exhibited no cold flow, that is, did not change shape at ambient conditions, while the copolymer of Example 7 did exhibit cold flow. The storage modulus, G', loss modulus, G", crossover modulus and crossover temperature were determined for the polydimethylsiloxane oligourea segmented copolymers of Examples 6–10. The results are set forth in Table 2.

TABLE 2

| Example | G' at 25° C. (Pa) | G" at 25° C. (Pa) | Crossover Modulus (Pa) | Crossover Temp. (° C.) |
|---|---|---|---|---|
| 6  | 20 × 10$^4$  | 3.0 × 10$^4$ | 5 × 10$^4$   | 141  |
| 7  | 6.0 × 10$^4$ | 2.0 × 10$^4$ | 2.7 × 10$^4$ | 45   |
| 8  | 13 × 10$^4$  | 1.7 × 10$^4$ | 0.5 × 10$^4$ | 53   |
| 9  | 10 × 10$^4$  | 2.0 × 10$^4$ | nd*          | >150 |
| 10 | 29 × 10$^4$  | 3.0 × 10$^4$ | 1.2 × 10$^4$ | 47   |

*not determinable

Examples 11–15

In Example 11, a mixture of 3.25 parts (13.3 mmoles) of tetramethyl-m-xylylene diisocyanate, 3.93 parts (13.3 mmoles) of n-octadecyl isocyanate dissolved in 17 parts toluene was added dropwise under agitation at room temperature to a solution of 105.5 parts (20 mmoles) of Polydimethylsiloxane Diamine A molecular weight 5,280 in 50 parts of toluene. The resulting polydimethylsiloxane oligourea segmented copolymer was air dried.

In Example 12, a mixture of 3.35 parts (13.3 mmoles) of 1,12-diisocyanatododecane and 3.93 parts (13.3 mmoles) of n-octadecyl isocyanate dissolved in 29 parts toluene was added dropwise under agitation at room temperature to a solution of 105.5 parts (20 mmoles) of Polydimethylsiloxane Diamine A molecular weight 5,280 in 46 parts of toluene. The resulting polydimethylsiloxane oligourea segmented copolymer was air dried.

In Example 13, a mixture of 3.41 parts (13.3 mmoles) of methylenedicyclohexylene-4,4'-diisocyanate and 3.93 parts (13.3 mmoles) of n-octadecyl isocyanate dissolved in 29 parts toluene was added dropwise under agitation at room temperature to a solution of 105.5 parts (20 mmoles) of Polydimethylsiloxane Diamine A molecular weight 5,280 in 46 parts of toluene. The resulting polydimethylsiloxane oligourea segmented copolymer was air dried.

In Example 14, a mixture of 3.25 parts (13.3 mmoles) of tetramethyl-m-xylylene diisocyanate and 1.58 parts (13.3 mmoles) of phenyl isocyanate dissolved in 11.5 parts toluene was added dropwise under agitation at room temperature to a solution of 105.5 parts (20 mmoles) of Polydimethylsiloxane Diamine A molecular weight 5,280 in 95 parts of toluene. The resulting polydimethylsiloxane oligourea segmented copolymer was air dried.

In Example 15, a polydimethylsiloxane oligourea segmented copolymer was prepared as in Example 14, except a mixture of 3.35 parts (13.3 mmoles) of 1,12-diisocyanatododecane was substituted for the tetramethyl-m-xylylene diisocyanate.

The polydimethylsiloxane oligourea segmented copolymers of Examples 11–15 had an average degree of oligomerization of 3, with Examples 11–12 and 14–15 exhibiting no cold flow, while Example 13 did exhibit cold flow. The storage modulus, G', the loss modulus, G", the crossover modulus and crossover temperature were determined for Examples 11–15. The results are set forth in Table 3.

TABLE 3

| Example | G' at 25° C. (Pa) | G" at 25° C. (Pa) | Crossover Modulus (Pa) | Crossover Temp. (° C.) |
|---|---|---|---|---|
| 11 | 100 × 10$^4$ | 34 × 10$^4$ | 1.5 × 10$^4$ | 116 |
| 12 | 200 × 10$^4$ | 18 × 10$^4$ | ~1 × 10$^4$  | 42  |
| 13 | 14 × 10$^4$  | 10 × 10$^4$ | 6 × 10$^4$   | 34  |
| 14 | 190 × 10$^4$ | 17 × 10$^4$ | 0.2 × 10$^4$ | 145 |
| 15 | 50 × 10$^4$  | 7 × 10$^4$  | 2 × 10$^4$   | 48  |

The polydimethylsiloxane oligourea segmented copolymers prepared using n-octadecylisocyanate exhibited higher loss modulus and lower crossover temperatures than copolymers prepared using phenyl isocyanate as the end-capper.

Copolymers prepared with tetramethyl-m-xylylene diisocyanate possess higher loss modulus and higher crossover temperature than copolymers prepared with 1,12-diisocyanatododecane.

Example 16

In Example 16, 60.3 parts (2.71 mmoles) of Polydimethylsiloxane Diamine C, molecular weight 22,300, was dissolved in 202 parts methylene chloride, and added dropwise to a solution of 0.9 parts (3.62 mmoles) of methylenediphenylene-4,4'-diisocyanate in 25 parts methylene chloride under agitation at room temperature. The resulting solution was dried in a vacuum oven at room temperature. The resulting isocyanate-terminated polydimethylsiloxane oligourea segmented copolymer having an average degree of oligomerization of 3, was an insoluble, elastomeric material.

Examples 17–28

Example 17

In Example 17, 52.76 parts (10.00 mmoles) Polydimethylsiloxane Diamine A molecular weight 5280, was dissolved in 50 parts toluene, and a mixture of 1.62 parts (6.67 mmoles) 1,12-diisocyanatododecane and 1.03 parts (6.67 mmoles) isocyanatoethyl methacrylate (available as MOI from Showa Rhodia Chemicals, Tokyo, Japan) was dissolved in 48 parts toluene and slowly added at room temperature to the solution with vigorous stirring. 1.0 part DAROCUR™ 1173 (a photoinitiator available from Ciba-Geigy, Hawthorne, N.Y.) was added per 100 parts copolymer solution. This solution was then divided into two portions.

The first portion of the resulting polydimethylsiloxane oligourea segmented copolymer solution was poured into a Petri dish and stood at room temperature until the solvent was evaporated. The storage modulus, G', loss modulus, G", crossover modulus, crossover temperature and shear creep viscosity at 25° C. and 300 seconds shear time were determined. The results are set forth in Table 4.

Examples 18–22

In Examples 18–22, polydimethylsiloxane oligourea segmented copolymers were prepared as in Example 17, except the 1,12-diisocyanatododecane, was substituted with:

1.97 parts (6.67 mmoles) 4,4'-diisocyanato-3,3'-dimethoxybiphenyl (Example 18)

1.67 parts (6.67 mmoles) of methylenediphenylene-4,4'-diisocyanate (Example 19)

1.75 parts (6.67 mmoles) of methylenedicyclohexylene-4,4'-diisocyanate (Example 20)

1.25 parts (6.67 mmoles) of m-xylylene diisocyanate (Example 21)

1.47 parts (6.67 mmoles) of 3-isocyanatomethyl-3,5,5-trimethylcyclohexyl isocyanate (Example 22).

As described in Example 17, each of the copolymer solutions were separated into two portions. The first portion examples were dried at room temperature and tested as described above. The results are set forth in Table 4.

TABLE 4

| Example | G' at 25° C. (Pa) | G" at 25° C. (Pa) | Crossover Modulus (Pa) | Crossover Temp. (° C.) | Shear creep viscosity at 25° C. (Pa·s)* |
|---|---|---|---|---|---|
| 17 | $60 \times 10^4$ | $7.0 \times 10^4$ | $0.35 \times 10^4$ | 43 | $>1 \times 10^9$ (6 kPa) |
| 18 | $1.9 \times 10^4$ | $0.9 \times 10^4$ | $0.5 \times 10^4$ | 117 | $7.2 \times 10^8$ (6 kPa) |
| 19 | $1.0 \times 10^4$ | $2.0 \times 10^4$ | $4.9 \times 10^4$ | 2 | $5.0 \times 10^5$ (1 Pa) |
| 20 | $1.7 \times 10^4$ | $3.0 \times 10^4$ | $5.0 \times 10^4$ | 6 | $5.7 \times 10^3$ (1 Pa) |
| 21 | $0.06 \times 10^4$ | $0.3 \times 10^4$ | $6.0 \times 10^4$ | −15 | $9.0 \times 10^2$ (1 Pa) |
| 22 | $0.12 \times 10^4$ | $0.7 \times 10^4$ | $5.0 \times 10^4$ | −15 | $7.5 \times 10^2$ (1 Pa) |

*300 seconds shear time; shear stress as indicated in parenthesis

The polydimethylsiloxane polyurea segmented oligomers of Examples 17 to 22 had an average degree of oligomerization of 3. The copolymers of Examples 17–19 exhibited no cold flow while the copolymers of Examples 20–22 exhibited cold flow.

The shear creep viscosities of Examples 17–22 varied over a broad range depending on the diisocyanate used, ranging from $7.5 \times 10^2$ to $>1 \times 10^9$ Pa·s, some of these relatively low molecular weight polymers were semisolid at room temperature, while others behaved like viscous liquids. Polydimethylsiloxane oligourea segmented copolymers with drastically different rheological properties can be made by selection of the diisocyanate used to prepare the copolymers.

Examples 23–28

Using the second portion provided in Examples 17–22, the solvent of these second portions of the resulting polydimethylsiloxane oligourea segmented copolymer solutions was evaporated. Separately, each copolymer was squeezed between two release-coated polyester films, with the release coating facing the copolymer, to a thickness of about 40 mils. Each sample was subjected to 1.73 mW of low intensity radiation for 20 minutes to effect cure. The UV radiation was provided by GE F40BL ultraviolet bulbs. Each film was removed from the release films and the mechanical properties, modulus, stress at break, and strain at break, swelling after being submerged in tetrahydrofuran (THF) for 24 hours calculated by weight, and extractables in the THF for the cured copolymers were determined. The results are set forth in Table 5.

TABLE 5

| Example | Modulus (MPa) | Stress at break (MPa) | Strain at break (%) | Swelling in THF (%) | Extractables (%) |
|---|---|---|---|---|---|
| 23 | 3.74 | 2.16 | 150 | 250 | 8.6 |
| 24 | 3.61 | 1.57 | 70 | 269 | 14.8 |
| 25 | 2.10 | 2.26 | 180 | 260 | 8.2 |
| 26 | 1.51 | 2.12 | 180 | 250 | 8.4 |
| 27 | 0.68 | 2.14 | 204 | 260 | 8.5 |
| 28 | 0.86 | 2.75 | 210 | 260 | 8.5 |

When cured, the polydimethylsiloxane oligourea segmented copolymers possessed similar stress at break and elongation at break. Tensile moduli of the cured materials that showed less tendency to flow when uncured, Examples 23–25, were higher than for those with low shear viscosities, Examples 26–28.

Examples 29–30

Example 29

In Example 29, Polydimethylsiloxane Diamine A molecular weight 5280, was fed at a rate of 6.22 g/min (0.00236 equivalents amine/min) into the first zone of an 18 mm co-rotating twin screw extruder (available from Leistritz Corporation, Allendale, N.J.) and a mixture of 50.8 parts by weight tetramethyl-m-xylylene diisocyanate, 32.2 parts isocyanatoethyl methacrylate, and 17.0 parts DAROCUR™ 1173 was fed at a rate of 0.378 g/min. (0.00236 equivalents isocyanate/min) into zone 6. The extruder had a 40:1 length-:diameter ratio and double-start fully intermeshing screws throughout the entire length of the barrel, rotating at 200 revolutions per minute. The temperature profile for each of the 90 mm zones was: zone 1 to 4–25° C.; zone 5–40° C.; zone 6–60° C.; zone 7–90° C.; zone 8–100° C.; and endcap-120° C. The resultant polymer was extruded, cooled in air, and collected. The storage modulus, G', crossover temperature and shear creep viscosity at 25° C. were determined. The loss modulus, G", at 25° C. and crossover modulus were not determinable. The results were as follows:

| | |
|---|---|
| Storage modulus | $>20 \times 10^4$ Pa |
| Crossover temperature | >170 |
| Shear creep viscosity | $3.0 \times 10^8$ Pa·s at 6 kPa |

Example 30

In Example 30, a portion of the copolymer of Example 29 was pressed between polyester films, subjected to ultraviolet irradiation and tested as in Examples 23–28. The results were as follows:

| | |
|---|---|
| Modulus | 3.59 MPa |
| Stress at break | 1.83 MPa |
| Strain at break | 140% |
| Swelling in THF | 285% |
| Extractables in THF | 11.9 |

Examples 31–36

Example 31

In Example 31, 100.0 parts (10.00 mmoles) Polydimethylsiloxane Diamine B, molecular weight 10,700, was dissolved in 50.0 parts toluene, and a mixture of 1.68 parts (6.67 mmoles) of 1,12-diisocyanatododecane, 1.03 parts (6.67 mmoles) of isocyanatoethyl methacrylate, and 15.0 parts toluene was slowly added at room temperature to the solution with vigorous stirring for 2 hours. Then, about 10 parts of 2-propanol was added and stirring was continued for 5 hours. 0.50 part DAROCUR™ 1173 per 100 parts of polydimethylsiloxane oligourea segmented copolymer was then to the copolymer solution. The polydimethylsiloxane oligourea segmented copolymer solution was separated into two portions. The first portion was poured into a Petri dish and let stand at room temperature until the solvent was evaporated. The sample was tested as described in Example 17 and the results are set forth in Table 6.

Examples 32–33

In Example 32, a polydimethylsiloxane oligourea segmented copolymer was prepared as in Example 31, except 100.0 parts (4.48 mmoles) Polydimethylsiloxane Diamine C, molecular weight 22,300 was substituted for Diamine B, and a mixture of 0.75 parts (2.99 mmoles) of 1,12-diisocyanatododecane, 0.46 parts (2.99 mmoles) of isocyanatoethyl methacrylate, and 15.0 parts of 2-propanol was used.

In Example 33, a polydimethylsiloxane oligourea segmented copolymer was prepared as in Example 31, except 100.0 parts (2.64 mmoles) Polydimethylsiloxane Diamine D (Lot 2), molecular weight 37,800, were substituted for Diamine B and a mixture of 0.43 parts (1.73 mmoles) of 1,12-diisocyanatododecane, 0.27 parts (1.73 mmoles) of isocyanatoethyl methacrylate, and 15.0 parts of 2-propanol was used.

The storage modulus, G', the loss modulus, G", the crossover modulus, the crossover temperature and the shear creep viscosity at 25° C. were determined for the polydimethylsiloxane oligourea segmented copolymers of Examples 32–33, each having an average degree of oligomerization of 3. The results, together with those for Examples 17 and 31, are set forth in Table 6.

TABLE 6

| Example | G' at 25° C. (Pa) | G" at 25° C. (Pa) | Crossover Modulus (Pa) | Crossover Temp. (° C.) | Shear creep viscosity at 25° C. (Pa · s)* |
|---|---|---|---|---|---|
| 17 | 60 × 10⁴ | 7.0 × 10⁴ | 0.35 × 10⁴ | 43 | >1 × 10⁹ (6 kPa) |
| 31 | 10 × 10⁴ | 5.0 × 10⁴ | 0.5 × 10⁴ | 44 | 8.4 × 10⁷ (50 Pa) |
| 32 | 0.9 × 10⁴ | 1.2 × 10⁴ | 1.3 × 10⁴ | 18 | 7.5 × 10³ (1 Pa) |
| 33 | 1.3 × 10⁴ | 1.3 × 10⁴ | 13 × 10⁴ | 25 | 7.4 × 10³ (1 Pa) |

*300 seconds shear time; shear stress as indicated

The results in Tables 6 indicate that two opposite factors affected the rheology of the copolymers of Examples 17 and 31–33. As the molecular weight of silicone diamine increased, the overall molecular weight of the polymer increased, while the concentration of the urea linkages decreased. In the examples, the latter factor predominated, as shear creep viscosity decreased with increasing molecular weight of the polydimethylsiloxane diamine.

Examples 34–36

In Examples 34–36, using the second portion samples of Examples 31–33, the copolymer solution for each copolymer prepared was air dried on polyester release liner. These Examples were prepared and cured as described in Example 23.

Once cured, the films were removed, the mechanical properties, modulus and stress at break and strain at break, swelling after being submerged in tetrahydrofuran (THF) for 24 hours calculated by weight, and extractables in the THF for each cured copolymer were determined. The results, together with those for Example 23 are set forth in Table 7.

TABLE 7

| Example | Modulus (MPa) | Stress at break (MPa) | Strain at break (%) | Swelling in THF (%) | Extractables (%) |
|---|---|---|---|---|---|
| 23 | 3.74 | 2.16 | 150 | 250 | 8.6 |
| 34 | 0.86 | 1.17 | 230 | 370 | 19.7 |
| 35 | 0.38 | 0.59 | 380 | 500 | 9.8 |
| 36 | 0.23 | 0.67 | 660 | 700 | 14.8 |

As can be seen from the data in Table 7, the tensile modulus of the copolymer prepared using lower molecular weight polydimethylsiloxane diamine (Example 23) was much higher than for the copolymers in that higher molecular weight polydimethylsiloxane diamines were used.

Examples 37–42

Example 37

In Example 37, 60 parts (6.00 mmoles) Polydimethylsiloxane Diamine B, molecular weight 10,700, was dissolved in a mixture of 100 parts toluene, 20 parts 2-propanol and a mixture of 0.98 parts (4.00 mmoles) of tetramethyl-m-xylylene diisocyanate, and 0.62 parts (4.00 mmoles) of isocyanatoethyl methacrylate, and 15.0 parts toluene was slowly added at room temperature to the solution with vigorous stirring for 2 hours. Then, about 10 parts of 2-propanol was added and stirring was continued for 5 hours. 0.50 part DAROCUR™ 1173 per 100 parts of polydimethylsiloxane oligourea segmented copolymer was then added to the copolymer. This solution was separated into two portions. One of the portions of the polydimethylsiloxane oligourea segmented copolymer solution was poured into a Petri dish and was allowed to stand at room temperature until the solvent was evaporated. The sample was tested as described in Example 17 and the results are set forth in Table 8.

Examples 38–39

In Example 38, a polydimethylsiloxane oligourea segmented copolymer was prepared as in Example 37, except a mixture of 15.84 parts (3.00 mmoles) Polydimethylsiloxane Diamine A molecular weight 5280, and 66.97 parts (3.00 mmoles) Polydimethylsiloxane Diamine C, molecular weight 22,300, dissolved in 69.00 parts toluene was substituted for Diamine B, and a mixture of 0.98 parts (4.00 mmoles) of tetramethyl-m-xylylene diisocyanate and 0.62 parts (4.00 mmoles) of isocyanatoethyl methacrylate was used.

In Example 39, a polydimethylsiloxane oligourea segmented copolymer was prepared as in Example 37, except 107.1 parts (3.00 mmoles) Polydimethylsiloxane Diamine D, molecular weight 35,700, were substituted for Diamine B and dissolved in a mixture of 100 parts toluene, and 10 parts 2-propanol, and a mixture of 0.49 parts (2.00 mmoles) of tetramethyl-m-xylylene diisocyanate and 0.31 parts (2.00 mmoles) of isocyanatoethyl methacrylate was used.

The storage modulus, G', the loss modulus, G", the crossover modulus, the crossover temperature, and the shear creep viscosity at 25° C. were determined for the polydimethylsiloxane oligourea segmented copolymers of Examples 38–39, each having an average degree of oligomerization of 3. The results are set forth in Table 8.

TABLE 8

| Example | G' at 25° C. (Pa) | G" at 25° C. (Pa) | Crossover Modulus (Pa) | Crossover Temp. (° C.) | Shear creep viscosity at 25° C. (Pa · s)* |
|---|---|---|---|---|---|
| 37 | $1.2 \times 10^4$ | $2.0 \times 10^4$ | $0.01 \times 10^4$ | 135 | $5.0 \times 10^6$ (20 Pa) |
| 38 | $7.0 \times 10^4$ | $4.1 \times 10^4$ | $0.3 \times 10^4$ | 139 | $1.2 \times 10^6$ (10 Pa) |
| 39 | $4.0 \times 10^4$ | $2.3 \times 10^4$ | $1.9 \times 10^4$ | 50 | $1.5 \times 10^5$ (1 Pa) |

*300 seconds shear time; shear stress as marked

The data in Table 8 demonstrate that by using blends of diamines, improved properties can be obtained. The copolymer of Example 38, prepared using a polydimethylsiloxane diamine having a number average molecular weight of 13,800 and prepared from a blend of polydimethylsiloxane diamines having molecular weights of 5,280 and 22,300, possessed a storage modulus, loss modulus and a crossover temperature above what would be predicted based on the data for the copolymers of Examples 37 and 39.

Examples 40–42

In Examples 40–42, using the second portion samples of Examples 37–39, the copolymer solution for each copolymer prepared, was air dried on polyester release liner. These Examples were prepared and cured as described in Example 23.

Once cured, the films were removed and the mechanical properties, modulus, stress at break, strain at break, swelling after being submerged in tetrahydrofuran (THF) for 24 hours calculated by weight, and extractables in the THF for each cured copolymers were determined. The results are set forth in Table 9.

TABLE 9

| Example | Modulus (MPa) | Stress at break (MPa) | Strain at break (%) | Swelling in THF (%) | Extractables (%) |
|---|---|---|---|---|---|
| 40 | 1.06 | 1.14 | 230 | 360 | 19.7 |
| 41 | 1.03 | 1.87 | 380 | 460 | 9.7 |
| 42 | 0.33 | 0.70 | 620 | 670 | 13.0 |

The data in Table 9 shows that as the molecular weight of the polydiorganosiloxane diamine increased stress at break decreased and elongation at break increased. Example 41 shows that copolymers with high stress at break and high elongation at break can be obtained using a blend of polydimethylsiloxanes, that is, 5280 and 22,300 molecular weights.

Examples 43–48

Example 43

In Example 43, 500 parts (43.0 mmoles) Polydimethylsiloxane Diamine B, molecular weight 10,700, was dissolved in a mixture of 300 parts toluene and a mixture of 7.51 parts (28.7 mmoles) of methylenedicyclohexylene-4,4'-diisocyanate, and 4.44 parts (28.7 mmoles) of isocyanatoethyl methacrylate, and 200 parts toluene was slowly added at room temperature to the solution with vigorous stirring for 2 hours. Then, about 50 parts of 2-propanol was added and stirring was continued for 5 hours. 0.50 part DAROCUR™ 1173 per 100 parts of polydimethylsiloxane oligourea segmented copolymer was then added to the copolymer. This solution was separated into two portions. One of the portions of the polydimethylsiloxane oligourea segmented copolymer solution was poured into a Petri dish and was allowed to stand at room temperature until the solvent was evaporated. The sample was tested as described in Example 17 and the results, including those of Example 20 are set forth in Table 10.

Examples 44–45

In Example 44, a polydimethylsiloxane oligourea segmented copolymer was prepared as in Example 43, except 600 parts (27.0 mmoles) Polydimethylsiloxane Diamine C, molecular weight 22,300, were substituted for Diamine B and dissolved in 404 parts toluene, and a mixture of 4.71 parts (19.0 mmoles) of methylene dicyclohexylene-4,4'-diisocyanate and 2.79 parts (18.0 mmoles) of isocyanatoethyl methacrylate dissolved in 195 parts toluene were used.

In Example 45, a polydimethylsiloxane oligourea segmented copolymer was prepared as in Example 43, except 100 parts (2.01 mmoles) Polydimethylsiloxane Diamine E, molecular weight 50,200, dissolved in 123 parts toluene were substituted for Diamine B, and a mixture of 0.35 parts (1.34 mmoles) or methylenedicyclohexylene-4,4'-diisocyanate and 0.21 parts (1.34 mmoles) of isocyanatoethyl methacrylate dissolved in 56 parts toluene was used.

The storage modulus, G', the loss modulus, G", the crossover modulus, the crossover temperature and the shear creep viscosity at 25° C. were determined for the polydimethylsiloxane oligourea segmented copolymers of Examples 44–45, each having an average degree of oligomerization of 3. The results are set forth, together with those for Example 20 in Table 10.

TABLE 10

| Example | G' at 25° C. (Pa) | G" at 25° C. (Pa) | Crossover Modulus (Pa) | Crossover Temp. (° C.) | Shear creep viscosity at 25° C. (Pa · s)* |
|---|---|---|---|---|---|
| 20 | $1.7 \times 10^4$ | $3.0 \times 10^4$ | $5.0 \times 10^4$ | 6 | $5.7 \times 10^3$ (1 Pa) |
| 43 | $4.0 \times 10^4$ | $3.0 \times 10^4$ | $2.8 \times 10^4$ | 35 | $1.7 \times 10^4$ (1 Pa) |
| 44 | $4.0 \times 10^4$ | $2.2 \times 10^4$ | $1.8 \times 10^4$ | 68 | $2.7 \times 10^4$ (1 Pa) |
| 45 | $3.8 \times 10^4$ | $1.8 \times 10^4$ | $1.4 \times 10^4$ | 65 | — |

*300 seconds shear time; shear stress as marked

The data in Table 10 demonstrates that with increasing molecular weight of the polydimethylsiloxane diamine used, the crossover modulus decreased while the crossover temperature generally increased.

Examples 46–48

In Examples 46–48, using the second portion samples of Examples 43–45, respectively the copolymer solution for each copolymer prepared was air dried on polyester release liner. These Examples were prepared and cured as described in Example 23.

Once cured, the films were removed and the mechanical properties, that is, modulus and stress at break and strain at break; swelling after being submerged in tetrahydrofuran (THF) for 24 hours calculated by weight, and extractables in the THF for each cured copolymer were determined. The results, together with those for Example 23 are set forth in Table 11.

TABLE 11

| Example | Modulus (MPa) | Stress at break (MPa) | Strain at break (%) | Swelling in THF (%) | Extractables (%) |
|---|---|---|---|---|---|
| 26 | 1.51 | 2.12 | 180 | 250 | 8.4 |
| 46 | 0.68 | 1.54 | 294 | 418 | 10.5 |
| 47 | 0.54 | 0.81 | 343 | 540 | 6.8 |
| 48 | 0.22 | 0.62 | 882 | 1260 | 21 |

The data in Table 11 demonstrates that as molecular weight of the polydimethylsiloxane increased, the modulus and stress at break decreased while the strain at break increased. Increasing molecular weight of the diamine also inhibited cure somewhat with 26% extractables when the diamine having a number average molecular weight of 49,700 was used.

Examples 49–50

Example 49

In Example 49, a polydimethylsiloxane oligourea segmented copolymer was prepared as in Example 29, except a mixture of 27.5 parts of methylenedicyclohexylene-4,4'-diisocyanate, 16.3 parts of isocyanatoethyl methacrylate, and 56.3 parts of DAROCUR™ 1173 was fed at a rate of 0.105 g/min (0.000330 equivalents isocyanate/min) into the first zone and Polydimethylsiloxane Diamine D, Lot 1, molecular weight 35,700, was fed at a rate of 6.2 g/min (0.000164 mol/min) in to the sixth zone. The rheological properties were as follows:

| | |
|---|---|
| Storage modulus | $3.1 \times 10^4$ Pa |
| Loss modulus | $2.0 \times 10^4$ Pa |
| Crossover modulus | $1.6 \times 10^4$ Pa |
| Crossover temperature | 65° C. |
| Shear creep viscosity | $3.8 \times 10^4$ Pa |

Example 50

In Example 50, the polydimethylsiloxane oligourea segmented copolymer prepared in Example 49 was exposed to 1.73 mW for 20 minutes low intensity ultraviolet irradiation as in Example 30. The mechanical properties and the swelling, calculated by weight, and extractables after immersion in tetrahydrofuran (THF) were as follows:

| | |
|---|---|
| Modulus | 0.25 MPa |
| Stress at break | 0.46 MPa |
| Strain at break | 621% |
| Swelling | 1050% |
| Extractables | 26% |

Examples 51–54

Examples 51–52

In Example 51, a polydimethylsiloxane oligourea segmented copolymer was prepared as in Example 31, except 105.52 parts (20.00 mmoles) Polydimethylsiloxane Diamine A molecular weight 5280, in 100.00 parts toluene, a mixture of 3.84 parts (15.74 mmoles) of tetramethyl-m-xylylene diisocyanate and 1.24 parts (7.99 mmoles) of isocyanatoethyl methacrylate in 15 parts toluene, and 20.00 parts 2-propanol were used.

In Example 52, a polydimethylsiloxane oligourea segmented copolymer was prepared as in Example 51, except a mixture of 4.40 parts (18.00 mmoles) of tetramethyl-m-xylylene diisocyanate and 0.62 parts (3.99 mmoles) of isocyanatoethyl methacrylate in 15 parts toluene was used.

The polydimethylsiloxane oligourea segmented copolymers of Examples 51 and 52 had degrees of polymerization of 5 and 10, respectively.

The storage modulus, G', loss modulus, G", crossover modulus, and crossover temperature were determined for Examples 51 and 52. The shear creep viscosity could not be measured for these copolymers as they were above the limit of the test instrument. The results are set forth in Table 12.

TABLE 12

| Example | G' at 25° C. (Pa) | G" at 25° C. (Pa) | Crossover Modulus (Pa) | Crossover Temp. (° C.) |
|---|---|---|---|---|
| 51 | $33 \times 10^4$ | $7 \times 10^4$ | $30 \times 10^4$ | 115 |
| 52 | $100 \times 10^4$ | $20 \times 10^4$ | $\sim 0.1 \times 10^4$ | 163 |

The data in Table 12 demonstrates that as the average degree of oligomerization increased from 5 to 10, the loss modulus increased and the crossover modulus decreased.

Examples 53–54

In Examples 53–54, using the second portion samples of Examples 51–52, respectively, and the copolymers were subjected to 1.73 mW for 20 minutes low intensity ultraviolet radiation to effect cure. The rheological characteristics were as set forth in Table 13.

TABLE 13

| Example | Modulus (MPa) | Stress at break (MPa) | Strain at break (%) | Swelling in THF (%) | Extractables (%) |
|---|---|---|---|---|---|
| 53 | 4.70 | 1.69 | 160 | 390 | 20.2 |
| 54 | 4.97 | 1.38 | 190 | ~600 | 45 |

The copolymers were curable, but as the average degree of oligomerization increased the cure was less efficient, as indicated by the high content of extractables.

Examples 55–56

In Example 55 a polydimethylsiloxane oligourea segmented copolymer was prepared as in Example 51, except a mixture of 4.19 parts (16.00 mmoles) of methylenedicyclohexylene-4,4'-diisocyanate and 1.24 parts (8.00 mmoles) of isocyanatoethyl methacrylate in 15 parts toluene was used.

In Example 56, a polydimethylsiloxane oligourea segmented copolymer was prepared as in Example 31, except a mixture of 4.72 parts (18.00 mmoles) of methylenedicyclohexylene-4,4'-diisocyanate and 0.62 parts (4.00 mmoles) of isocyanatoethyl methacrylate in 15 parts toluene was used.

The copolymers of Examples 55–56 had average degrees of polymerization of 5 and 10, respectively. The storage modulus, G', the loss modulus, G", the crossover temperature, and the shear creep viscosity of the copolymers of Examples 55 and 56, together with those of Example 20 that was prepared using the same reactants but in proportions such that the degree of oligomerization was 3, are set forth in Table 14.

TABLE 14

| Example | G' at 25° C. (Pa) | G" at 25° C. (Pa) | Crossover Modulus (Pa) | Crossover Temp. (° C.) | Shear creep viscosity at 25° C. (Pa · s)* |
|---|---|---|---|---|---|
| 20 | $1.7 \times 10^4$ | $3.0 \times 10^4$ | $5.0 \times 10^4$ | 6 | $5.7 \times 10^3$ (1 Pa) |
| 55 | $12.0 \times 10^4$ | $8.0 \times 10^4$ | $7.0 \times 10^4$ | 36 | $2.8 \times 10^3$ (1 Pa) |
| 56 | $27.0 \times 10^4$ | $9.0 \times 10^4$ | $5.0 \times 10^4$ | 83 | $7.3 \times 10^6$ (6 kPa) |

*300 seconds shear time; shear stress as indicated in parenthesis

The data in Table 14 demonstrate that as the average degree of oligomerization increased, G', G", and the crossover, temperature increased, and the shear creep viscosity dramatically increased.

Examples 57–58

In Examples 57–58, using the second portion samples of Examples 55–56, respectively, and each of the copolymers was subjected to 1.73 mW of low intensity ultraviolet radiation for 20 minutes to effect cure. The rheological characteristics of the copolymers of Examples 57–58 together with those of Example 26 that was prepared using the same reactants but achieving an average degree of oligomerization of 3, are set forth in Table 15.

TABLE 15

| Example | Modulus (MPa) | Stress at break (MPa) | Strain at break (%) | Swelling in THF (%) | Extractables (%) |
|---|---|---|---|---|---|
| 26 | 1.51 | 2.12 | 180 | 250 | 8.4 |
| 57 | 0.77 | 1.81 | 310 | 407 | 22.3 |
| 58 | 0.50 | 0.31 | 870 | dissolved | dissolved |

The data in Table 15 demonstrate the average degree of oligomerization increased, the copolymer was more difficult to cure as indicated by the increased percent swelling in THF and percent extractables from the copolymer of Example 26 to the copolymer of Example 57 and the fact that the copolymer of Example 58 dissolved in the THF.

Examples 59–64

Examples 59–61

In Example 59, 99.6 parts Polydimethylsiloxane Diamine D, Lot 2, molecular weight 37,800, and 0.4 parts ESA-CURE™ KB1, a photoinitiator, available from Sartomer Company, Exton, Pa., were fed at a rate of 3.58 g/min (0.000189 equivalents amine/min) into the first zone of an 18 mm counter-rotating twin screw extruder available from Leistritz Corporation, Allendale, N.J.). A mixture of 45.8 parts by weight methylene dicyclohexylene-4,4'-diisocyanate and 54.2 parts by weight isocyanatoethyl methacrylate was fed at a rate of 0.0266 g/min (0.000186 equivalents isocyanate/min) into the fourth zone. The extruder had a 40:1 length:diameter ratio and double-start fully intermeshing screws throughout the entire length of the barrel, rotating at 100 revolutions per minute. The temperature profile of the each of the 90 mm long zones was: zone 1 to 4–50° C.; zone 5–90° C.; zone 6–170° C., zone 7–180° C.; zone 8–100° C.; and endcap–90° C. Zone seven was vacuum vented. The resultant extrudate was cooled in air and collected.

In Example 60, a polydimethylsiloxane oligourea segmented copolymer was prepared as in Example 59, except a mixture of 77.2 parts by weight methylene dicyclohexylene-4,4'-diisocyanate and 22.8 parts by weight isocyanatoethyl methacrylate was fed at a rate of 0.0252 g/min (0.000185 equivalents isocyanate/min) into zone 4.

In Example 61, a polydimethylsiloxane oligourea segmented copolymer was prepared as in Example 59, except a mixture of 83.5 parts by weight methylene dicyclohexylene-4,4'-diisocyanate and 16.5 parts by weight isocyanatoethyl methacrylate was fed at a rate of 0.0249 g/min (0.000185 equivalents isocyanate/min) into zone 4, zone 6 was at 180° C., and zone 8 and endcap were at 150° C.

The copolymers of Examples 59–61 had degrees of polymerization of 2, 5 and 7, respectively. The storage modulus, G", loss modulus, G", crossover modulus, crossover temperature, and shear creep viscosity at 25° C. were determined for Examples 59–61 and, together with those of Example 49 that was prepared from the same reactants but had an average degree of oligomerization of 3, are set forth in Table 16.

TABLE 16

| Example | G' at 25° C. (Pa) | G" at 25° C. (Pa) | Crossover Modulus (Pa) | Crossover Temp. (° C.) | Shear creep viscosity at 25° C. (Pa · s)* |
|---|---|---|---|---|---|
| 59 | $0.8 \times 10^4$ | $0.9 \times 10^4$ | $1.0 \times 10^4$ | 18 | $4.6 \times 10^4$ (1 Pa) |
| 49 | $3.1 \times 10^4$ | $2.0 \times 10^4$ | $1.6 \times 10^4$ | 65 | $3.8 \times 10^4$ (1 Pa) |
| 60 | $6.0 \times 10^4$ | $1.8 \times 10^4$ | $1.8 \times 10^4$ | 104 | $2.2 \times 10^6$ (20 Pa) |
| 61 | $7.2 \times 10^4$ | $1.8 \times 10^4$ | $1.9 \times 10^4$ | 133 | $1.8 \times 10^7$ (20 Pa) |

*300 seconds shear time; shear stress as marked

The data in Table 16 demonstrate that as the average degree of oligomerization increased, the shear creep viscosity, storage modulus, crossover modulus and temperature increased.

Examples 62–64

In Examples 62–64, 0.5 parts DAROCUR™ 1173 was added to 100 parts the polydimethylsiloxane oligourea segmented copolymers of Examples 59–61, respectively, and the copolymers were subjected to 1.73 mW for 20 minutes low intensity radiation to cure the copolymers. The copolymer of Example 64 did not cure. The modulus, stress at break, strain at break, THF swelling calculated by weight, and THF extractables for Examples 62–63 and Example 50 are set forth in Table 17.

TABLE 17

| Example | modulus (MPa) | Stress at break (MPa) | Strain at break (%) | Swelling in THF (%) | Extractables (%) |
|---|---|---|---|---|---|
| 62 | 0.27 | 0.71 | 572 | 800 | 16 |
| 50 | 0.25 | 0.46 | 621 | 1050 | 26 |
| 63 | 0.2 | 0.22 | 868 | 2200 | 45 |

The data in Table 17 demonstrates that as the average degree of oligomerization increased, the stress at break decreased and the strain at break increased. Also as the average degree of oligomerization increased for these high molecular weight polydimethylsiloxane diamines, the percent extractables also increased, indicating diminished cure- with no cure occurring at an average degree of oligomerization of 7.

Examples 65–69

Examples 65–67

In Example 65, a polydimethylsiloxane oligourea segmented copolymer was prepared as in Example 17, except a mixture of 3.25 parts (13.33 mmoles) of tetramethyl-m-xylylene diisocyanate and 1.85 parts (13.33 mmoles) of vinyl dimethyl azlactone available from S.N.P.E. Chemicals, Princeton, N.J., in 15 parts toluene was added dropwise to a solution of 105.52 parts (20.00 mmoles) Polydimethylsiloxane Diamine A molecular weight 5280 in 112 parts toluene, and then 15 parts 2-propanol was added.

In Example 66, a polydimethylsiloxane oligourea segmented copolymer was prepared as in Example 17, except a mixture of 3.25 parts (6.67 mmoles) of tetramethyl-m-xylylene diisocyanate, and 2.68 parts (6.67 mmoles) of m-isopropenyl-α,α-dimethylbenzyl isocyanate in 15 parts toluene was added dropwise to a solution of 105.52 parts (10.00 mmoles) of Polydimethylsiloxane Diamine A molecular weight 5280 in 112 parts toluene, and then 15 parts 2-propanol was added.

In Example 67, 50 parts of the polydimethylsiloxane oligourea segmented copolymer of Example 29 was blended with 50 parts of the polydimethylsiloxane oligourea segmented copolymer of Example 66.

The average degree of oligomerization of each of the copolymers of Examples 65–67 was 3. The storage modulus, G', loss modulus, G", crossover modulus and crossover temperature were determined for these Examples. The shear creep viscosity was beyond the limits of the test equipment. The results are set forth in Table 18.

TABLE 18

| Example | G' at 25° C. (Pa) | G" at 25° C. (Pa) | Crossover Modulus (Pa) | Crossover Temp. (° C.) |
| --- | --- | --- | --- | --- |
| 65 | 100 × 10$^4$ | 10 × 10$^4$ | 20 × 10$^4$ | 132 |
| 66 | 70 × 10$^4$ | 30 × 10$^4$ | 20 × 10$^4$ | 127 |
| 67 | 70 × 10$^4$ | 20 × 10$^4$ | 8 × 10$^4$ | 125 |

The data in Table 18 shows little difference in the copolymers of Examples 65–67, the differences in the copolymers being only in the terminal groups.

Examples 68 and 69

In Examples 68 and 69, 0.5 part DAROCUR™ 1173 was added to the copolymers of Examples 65 and 67, respectively, and the copolymer of Example 68 was subjected to 1.73 mW for 20 minutes ultraviolet irradiation while the copolymer of Example 69 was subjected to 1.73 mW for 60 minutes ultraviolet irradiation to effect free-radical polymerization. The copolymner of Example 66, compounded with 0.5 parts DAROCUR™ 1173, did not homopolymerize when irradiated as in Example 69 possibly due to steric hindrance. The mechanical properties are set forth in Table 19:

TABLE 19

| Example | Modulus (MPa) | Stress at break (MPa) | Strain at break (%) | Swelling in THF (%) | Extractables (%) |
| --- | --- | --- | --- | --- | --- |
| 68 | 6.31 | 1.75 | 111 | 285 | 9.5 |
| 69 | 4.03 | 1.35 | 120 | 317 | 12.7 |

The data in Table 19 shows that a polydimethylsiloxane oligourea segmented copolymer incapable of homopolymerization was copolymerized with other free radically polymerizable polydimethylsiloxane oligoureas and formed a mixed copolymer.

Examples 70–71

Example 70

In Example 70, a polydiorganosiloxane oligourea segmented polymer was prepared as in Example 17, except that 100.27 parts (10.4 mmoles) Polydiphenyldimethsiloxane Diamine F, molecular weight 9,620 dissolved in 94 parts toluene was substituted for Diamine A, and a mixture of 1.82 parts (6.95 mmoles) of methylenecyclohexylene-4,4'-diisocyanate and 1.08 parts (6.95 mmoles) of isocyanatoethyl methacrylate was used. The copolymer of this Example had a degree of oligomerization of 3. The rheological properties were as follows:

| | |
| --- | --- |
| Storage modulus | 2.8 × 10$^4$ Pa |
| Loss modulus | 2.8 × 10$^4$ Pa |
| Crossover modulus | 2.8 × 10$^4$ Pa |
| Crossover temperature | 25° C. |

Example 71

In Example 71, 0.5 parts DAROCUR™ 1173 was added to the copolymer of Example 70 and the copolymer was subjected to 1.73 mW for 20 minutes low intensity radiation to effect curing. The mnechanical properties, swelling in tetrahydrofuran (THF) and THF extractables were as follows:

| | |
| --- | --- |
| Modulus | 0.87 MPa |
| Stress at break | 1.37 MPa |
| Strain at break | 203% |
| Swelling in THF | 330% |
| THF extractables | 13% |

Example 72

In Example 72, a mixture of 99 parts by weight Polydimethylsiloxane Diamine C, Lot 2, molecular weight 22,300, and 1 part by weight VAZO™ 64, a thermal initiator available from DuPont Co., was fed into the sixth zone of an 18 mm co-rotating twin screw extruder having a 40:1 length:diameter ratio (available from Leistritz Corporation, Allendale, N.J.) at a rate of 6.24 g/min (0.000560 equivalents amine/min). A mixture of 62 parts by weight tetramethyl-m-xylene diisocyanate and 38 parts by weight isocyanatoethyl methacrylate was fed into the sixth zone at a rate of 0.0645 g/min (0.000486 equivalents isocyanate/min). The feed line of this stream was placed close to the screw threads. The extruder had double-start fully intermeshing screws throughout the entire length of the barrel, rotating at 75 revolutions per minute. The temperature for the entire extruder and endcap was set at a 40° C. The material sat at room temperature for 197 days without curing; consequently the VAZO™ 64 initiator became ineffective. More initiator was added to the copolymer by kneading in 1 part by weight VAZO™ 64 to 100 parts by weight copolymer. The copolymer was cured for 20 minutes in water at 100° C. The cured copolymer was submerged in tetrahydrofuran for 24 hours and swelled 930% by volume.

Examples 73–77

Examples 73–75

In Example 73, 50 parts (9.47 mmoles) Polydimethylsiloxane Diamine A molecular weight 5280, was degassed in a 250 mL round bottom flask and 150 parts dichloromethane was added and mixed well. Next, 1.38 parts (6.24 mmoles) aminopropyl triethoxysilane (APS) was added with stirring. Finally, 3.08 parts (12.62 mmoles) tetramethyl-m-xylylene diisocyanate was added and the solution was mixed for 20 minutes. The polydimethylsiloxane oligourea segmented copolymer solution was poured into an aluminum tray and stood at room temperature until the solvent evaporated.

In Example 74, a polydimethylsiloxane oligourea segmented copolymer was prepared as in Example 73, except 1.19 parts (6.23 mmoles) of aminopropyl methyl diethoxysilane (APMS) was substituted for the aminopropyl triethoxysilane.

In Example 75, a polydimethylsiloxane oligourea segmented copolymer was prepared as in Example 73, except 1.54 parts (6.23 mmoles) of isocyanatopropyl triethoxysilane (IPS) was substituted for the aminopropyl triethoxysilane, and 1.53 parts (6.27 mmoles) of tetramethyl-m-xylylene diisocyanate was used.

The storage modulus, G', the loss modulus, G", and crossover temperature were determined for Examples 73–75. The crossover modulus was determined for Examples 73 and 75, but was not determinable for Example 74. The results are set forth in Table 20.

TABLE 20

| Example | Capping agent | G' at 25° C. (Pa) | G" at 25° C. (Pa) | Crossover Modulus (Pa) | Crossover Temp. (° C.) |
|---|---|---|---|---|---|
| 73 | APS | 300 × 10⁴ | 12 × 10⁴ | 25 × 10⁴ | 165 |
| 74 | APMS | 300 × 10⁴ | 80 × 10⁴ | — | >170 |
| 75 | IPS | 50 × 10⁴ | 20 × 10⁴ | 0.4 × 10⁴ | 150 |

Examples 76–77

In Examples 76–77, to 100 parts of each of the copolymers of Examples 74–75, respectively, was added 1.25 parts trichloroacetic anhydride, and the solution was subsequently air dried on polyester release liner. These samples were cured for 14 days at 22° C. The cured copolymers of Examples 76 and 77 were submerged in THF for 24 hours and swelled 340 and 290 percent by volume, respectively.

Examples 78–83

Examples 78–80

In Example 78, a mixture of 32.9 parts by weight tetramethyl-m-xylylene diisocyanate, 32.2 parts by weight isocyanatopropyl triethoxysilane, 33.8 pairs by weight octyl triethoxy silane, and 1.0 parts by weight dibutyl tin dilaurate was fed into the fifth zone of an 18 mm counter-rotating twin screw extruder having a 40:1 length:diameter ratio (available from Leistritz Corporation, Allendale, N.J.) at a rate of 0.823 g/min (0.00331 equivalents isocyanate/min). The feed line of this stream was placed close to the screw threads. Polydimethylsiloxane Diamine A molecular weight 5,280, was added the fifth zone at a rate of 8.61 g/min (0.00326 equivalents amine/min). The extruder had double-start fully intermeshing screws throughout the entire length of the barrel, rotating at 50 revolutions per minute. The temperature profile for each of the 90 mm long zones was: zones 1 through 4–30° C.; zone 5–40° C.; zone 6–80° C.; zone 7–90° C.; zone 8–130° C.; and endcap-140° C. Zone seven was vacuum vented to remove entrained air. The resultant polydimethylsiloxane oligourea segmented copolymer was extruded and samples were immediately pressed and cured for one week at 22° C., 50% relative humidity.

In Example 79, a mixture of 32.9 parts by weight tetramethyl-m-xylylene diisocyanate, 32.2 parts by weight isocyanatopropyl triethoxysilane, 33.8 parts by weight octyltriethoxy silane, and 1.0 parts by weight dibutyl tin dilaurate was fed into the fifth zone of an 18 mm counter-rotating twin screw extruder having a 40:1 length:diameter ratio (available from Leistritz Corporation, Allendale, N.J.) at a rate of 0.387 g/min (0.00155 equivalents isocyanate/min). The feed line of this stream was placed close to the screw threads. Polydimethylsiloxane Diamine B, molecular weight 10,700, was added the fifth zone at a rate of 8.65 g/min (0.00162 equivalents amine/min). The extruder had double-start fully intermeshing screws throughout the entire length of the barrel, rotating at 50 revolutions per minute. The temperature profile for each of the 90 mm long zones was: zones 1 through 4–30° C.; zone 5–40° C.; zone 6–80° C.; zone 7–90° C.; zone 8 and endcap-120° C. Zone seven was vacuum vented to remove entrained air. The resultant polydimethylsiloxane oligourea segmented copolymer was extruded and collected.

In Example 80, a mixture of 32.9 parts by weight tetramethyl-m-xylylene diisocyanate, 32.2 parts by weight isocyanatopropyl triethloxysilane, 33.8 parts by weight octyltriethoxy silane, and 1.0 parts by weight dibutyl tin dilaurate was fed into the fifth zone of an 18 mm counter-rotating twin screw extruder having a 40:1 length:diameter ratio (available friom Leistritz Corporation, Allendale, N.J.) at a rate of 0.2171 g/min (0.000872 equivalents isocyanate/min). Tlhe feed line of this stream was placed close to the screw threads. Polydimethylsiloxane Diamine C, molecular weight 22,300, was added the fifth zone at a rate of 8.62 g/min (0.000773 equivalents amine/min). The extruder had double-start fully intermeshing screws throughout the entire length of the barrel, rotating at 50 revolutions per minute. The temperature profile for each of the 90 mm long zones was: zones 1 through 4–30° C.; zone 5–40° C.; zone 6–80° C.; zone 7–90° C.; zone 8 and endcap-120° C. Zone seven was vacuum vented to remove entrained air. The resultant polymer was extruded and collected.

Each of the copolymers of Examples 78–80 was tested for the storage modulus, G', the loss modulus, G", and crossover temperature within three hours of extrusion. The crossover modulus was determined for Examples 79 and 80, but was not determinable for Example 78. The results are set forth in Table 22.

TABLE 22

| Example | G' at 25° C. (Pa) | G" at 25° C. (Pa) | Crossover Modulus (Pa) | Crossover Temp. (° C.) |
|---|---|---|---|---|
| 78 | 24 × 10⁴ | 5.0 × 10⁴ | — | >180 |
| 79 | 10 × 10⁴ | 5.0 × 10⁴ | 0.03 × 10⁴ | 145 |
| 80 | 10 × 10⁴ | 3.0 × 10⁴ | 0.2 × 10⁴ | 130 |

Examples 81–83

In Examples 81–83, copolymers prepared in Examples 78–80, respectively, were pressed immediately after extrusion and cured for one week at 22° C., 50% relative humidity. The copolymers were tested for mechanical properties and swelling in THF, calculated by volume. The results of mechanical testing are set forth in Table 23.

TABLE 23

| Example | Modulus (MPa) | Stress at break (MPa) | Strain at break (%) | Swelling in THF (%) |
|---|---|---|---|---|
| 81 | 4.82 | 1.39 | 110 | 430 |
| 82 | 1.90 | 0.81 | 180 | 680 |
| 83 | 1.17 | 0.89 | 370 | 900 |

As can be seen from the data in Table 23, as the molecular weight of the polydimethylsiloxane diamine increased, the modulus and stress at break decreased and the strain at break increased. Also as the diamine molecular weight increased, swelling increased indicating lower crosslink density.

Examples 84–85

Example 84

In Example 84, a mixture of 32.9 parts by weight tetramethyl-m-xylylene diisocyanate, 32.2 parts by weight isocyanatopropyl triethoxysilane, 33.8 parts by weight octyl triethoxysilane, and 1.0 parts by weight dibutyl tin dilaurate was fed into the fifth zone of an 18 mm counter-rotating twin screw extruder having a 40:1 length:diameter ratio (available fron Leistritz Corporation, Allendale, N.J.) at a rate of 0.398 g/min (0.00160 equivalents isocyanate/min). The feed line of this stream was placed close to the screw threads. 75 parts by weight Polydimethylsiloxane Diamine B, molecular weight 10,700, was mixed with 25 parts by weight Polydiphenyldimethylsiloxane Diamine F, molecular weight 9,620; the number average molecular weight of this mixture was 10,400. This diamine mixture was fed into the fifth zone of the extruder at a rate of 8.72 g/min (0.00168 equivalents amine/min). The extruder had double-start fully intermeshing screws throughout the entire length of the barrel, rotating at 50 revolutions per minute. The temperature profile for each of the 90 mm zones was: zones 1 through 4–30° C.; zone 5–35° C.; zone 6–80° C.; zone 7–90° C.; zones 8 and endcap–120° C. Zone seven was vacuum vented to remove entrained air. The resultant polymer was extruded, collected and tested within three hours for rheological properties. The results were as follows:

| Storage modulus | 10 × 10⁴ Pa |
|---|---|
| Loss modulus | 2.4 × 10⁴ Pa |
| Crossover modulus | none |
| Crossover temperature | >180° C. |

Example 85

In Example 85, the copolymer prepared in Example 84 was pressed immediately after extrusion and cured for one week at 22° C., 50% relative humidity. The copolymers were tested for mechanical properties and swelling in THF, calculated by volume. The properties were as follows:

| Modulus | 1.6 MPa |
|---|---|
| Stress at break | 0.77 MPa |
| Strain at break | 740 |
| Swelling | 103% |

Examples 86–88

In Example 86, Polydimethylsiloxane Diamine A, Lot 1, molecular weight 5280, was injected at a rate of 147 g.min (0.0279 mol/min) into zone 8 of a Berstorff 40 mm diameter, 1600 mm length co-rotating extruder. Tetramethyl-m-xylylene diisocyanate was injected into zone 9 at a rate of 7.11 g/min (0.0291 mol/min). The screws rotated at 100 revolutions per minute. The temperatures of the individual zones were: zones 1 through 7 (not used); zone 8–60° C., zone -9–120° C., zone 10 and encap—180° C. The material was extruded into a strand, cooled in a liquid bath, and pelletized.

20 grams of the UV-curable composition of Example 20, 20 grams of polydimethylsiloxane polyurea segmented copolymer (as prepared above) and 20 grams toluene/isopropanol 50/50 mixture were agitated until a homogeneous solution was made. The sample was air dried.

In Example 87, Polydimethylsiloxane Diamine A, Lot 1, molecular weight 5280, was injected at a rate of 169 g.min (0.0318 mol/min) into zone 8 of a Berstorff 40 mm diameter, 1600 mm length co-rotating extruder. Methylenedicyclohexylene-4,4'-diisocyanate was injected into zone 9 at a rate of 8.33 g/min (0.0318 mol/min). The screws rotated at 100 revolutions per minute. The temperatures of the individual zones were: zones 1 through 7 (not used); zone 8–60° C., zone-9–120° C., zone 10 and encap-180° C. The material was extruded into a strand, cooled in a liquid bath, and pelletized.

20 grams of the UV-curable composition of Example 20, 20 grams of polydimethylsiloxane polyurea segmented copolymer (as prepared above) and 20 grams toluene/isopropanol 50/50 mixture were agitated until a homogeneous solution was made. The sample was air dried.

In Example 88, a blend UV-curable polydiorganosiloxane oligourea segmented copolymer and non-curable polydiorganosiloxane polyurea segmented copolymer was made analogously as in Example 86, except 20 grams of UV-curable composition of Example 20 was substituted with 20 grams polydiorganosiloxane oligourea segmented copolymer of Example 29.

The storage modulus, G', loss modulus, G" (at 25° C.), crossover modulus, and crossover temperature were determined for the uncured blends of UV curable polydiorganosiloxane oligourea segmented copolymers with polydiorganosiloxane polyurea segmented copolymers of Examples 86–88. The results are set forth in Table 24.

TABLE 24

|  | Ex. 86 | Ex 87 | Ex. 88 |
| --- | --- | --- | --- |
| G' | $7.8 \times 10^5$ Pa | $1.4 \times 10^5$ Pa | $3.0 \times 10^5$ Pa |
| G" | $1.2 \times 10^5$ Pa | $5.8 \times 10^4$ Pa | $3.0 \times 10^4$ Pa |
| crossover modulus | $2.1 \times 10^5$ Pa | $8.9 \times 10^2$ Pa | undeterminable |
| crossover temperaturer | 112° C. | 142° C. | above 170° C. |

Dried portions of the samples of Examples 86, 87, and 88 were pressed, cured and tested for mechanical properties, swellability in the THF, and extractability in the THF, as described in Example 23. The results are set forth in Table 25

TABLE 25

|  | Ex. 86 | Ex. 87 | Ex. 88 |
| --- | --- | --- | --- |
| Modulus [MPa] | 3.44 | 1.18 | 4.67 |
| Stress at break [MPa] | 1.71 | 1.50 | 1.69 |
| Strain at break | 230% | 290% | 200% |
| Swellability | 1700% | 1200% | 1300% |
| Extractables | 54% | 37% | 42% |

Example 89

In Example 89, a blend of equal parts of the compositions of Example 20, Example 43, Example 44, and Example 59 was made in a 50/50 toluene/isopropanol mixture, and subsequently dried in air.

The storage modulus, G', loss modulus, G" (at 25° C.), crossover modulus, and crossover temperature were determined for the uncured portion of the sample. The results are set forth in Table 24.

TABLE 26

| G' | $8.0 \times 10^3$ Pa |
| --- | --- |
| G" | $1.0 \times 10^4$ Pa |
| crossover modulus | $1.7 \times 10^4$ Pa |
| crossover temperature | 12° C. |

A portion of the sample was pressed, cured, and characterized as in Example 86, and the results are presented below.

|  | Ex. 89 |
| --- | --- |
| Modulus [MPa] | 0.55 |
| Stress at break [MPa] | 1.38 |
| Strain at break | 308% |
| Swellability | 800% |
| Extractables | 10% |

Example 90

In Example 90, 0.30 grams , 1,12-diaminedodecane (Available from Aldrich Chemical), and 100.0 grams Polydimethylsiloxane Diamine D, Lot 2 was dissolved in 100 grams of a 50/50 toluene/isopropanol mixture. To the solution was added dropwise a mixture of 0.46 grams isocyanatoethylmethacrylate and 0.72 grams tetramethyl-m-xylylene diisocyanate in 20 grams toluene/isopropanol (50/50) mixture. To the solution was added 1.0 gram DAROCUR™ 1173, and the resulting mixture was dried in air to form a white, viscous fluid. One part of the uncured polymer was used to test rheological properties as described in Example 86, and the results are presented below.

| Storage Modulus at 25° C. | $1.1 \times 10^1$ Pa |
| --- | --- |
| Loss Modulus at 25° C. | $2.4 \times 10^2$ Pa |
| Crossover Modulus | undetermined |
| Crossover Temperature | below −30° C. |

A portion of the dried polymer was pressed, cured, and tested as described in Example 86

| Modulus [MPa] | 0.13 |
| --- | --- |
| Stress at break [MPa] | 0.21 |
| Strain at break | 377% |
| Swelling in THF | 1210% |
| Extractables | 40.0% |

Example 91

In Example 91, 1.9 grams 1,12-diaminedodecane, and 100.0 grams Polydimethylsiloxane Diamine A, lot 1 was dissolved in 100 grams of a 50/50 toluene/isopropanol mixture. To the solution was added dropwise a mixture of 2.94 grams isocyanatoethylmethacrylate and 4.62 grams tetramethyl-m-xylylene diisocyanate in 20 grams of a toluene/isopropanol 50/50 mixture. To the solution was added 1.0 gram DAROCUR™ 1173, and the resulting mixture was dried in air to form a hazy, semisolid. One part of the uncured polymer was used to test rheological properties as described in Example 86.

| Storage Modulus at 25° C. | $2.0 \times 10^5$ Pa |
| --- | --- |
| Loss Modulus at 25° C. | $9.3 \times 10^4$ Pa |
| Crossover Modulus | $8.3 \times 10^4$ Pa |
| Crossover Temperature | 40° C. |

A portion of the dried polymer was pressed, cured, and tested as described in Example 86.

| Modulus [MPa] | 6.26 |
| --- | --- |
| Stress at break [MPa] | 1.73 |
| Strain at break | 100% |
| Swelling in THF | 317% |
| Extractables | 13.3% |

Example 92

In Example 92, 0.96 grams Polyamine IH1000 (available from Air Products and Chemicals, Inc.), and 100.0 grams Polydimethylsiloxane Diamine D, Lot 2 was dissolved in 100 grams of a toluene/isopropanol 50/50 mixture. To the solution was added dropwise a mixture of 0.46 grams isocyanatoethylmethacrylate and 0.72 grams tetramethyl-m-xylylene diisocyanate in 20 grams toluene/isopropanol (50/50) mixture. To the solution was added 1.0 gram DAROCUR™ 1173, and the resulting mixture was dried in air to form white, very viscous fluid. One part of the polymer was used to test rheological properties as described in Example 86.

| Storage Modulus at 25 C. | $1.3 \times 10^2$ Pa |
|---|---|
| Loss Modulus at 25 C. | $9.8 \times 10^2$ Pa |
| Crossover Modulus | $1.0 \times 10^4$ Pa |
| Crossover Temperature | $-30°$ C. |

A portion of the dried polymer was pressed, cured, and tested as described in Example 86.

| Modulus [MPa] | 0.21 |
|---|---|
| Stress at break [MPa] | 0.62 |
| Strain at break | 516% |
| Swelling in THF | 1027% |
| Extractables | 20.3% |

Example 93

In Example 93, 5.24 grams tetramethyl-m-xylylene diisocyanate was charged to a 500 ml flask in 10 milliliters of dichloromethane. To this was added 31.7 grams of Jeffamine D-2000, and the sample was well mixed. Next was added a solution of 61.4 grams of PDMS Diamine A, Lot 1 in 40 ml dichloromethane. Next, 1.66 grams isocyanatoethylmethacrylate was added and the solution was mixed for 15 minutes, followed by the addition of 1.1 grams DAROCUR™ 1173. The mixture was allowed to dry on a liner in the dark to form blueish, somewhat inhomogeneous semisolid.

One part of the uncured polymer was used to test rheological properties as described in Example 86.

| Storage Modulus at 25° C. | $1.6 \times 10^5$ Pa |
|---|---|
| Loss Modulus at 25° C. | $6.8 \times 10^4$ Pa |
| Crossover Modulus | $5.5 \times 10^4$ Pa |
| Crossover Temperature | 55° C. |

Dried polymer was pressed at 90° C. into approx. 1 millimeter film between two liners and exposed to low intensity UV lights for 20 minutes, and tested as described in Example 86.

| Modulus [MPa] | 4.38 |
|---|---|
| Stress at break [MP] | 1.04 |
| Strain at break | 218% |
| Swelling in THF | 430% |
| Extractables | 14.1% |

Example 94

In Example 94, a Berstorff 25 mm diameter corotating twin screw extruder having a 29.5:1 length diameter ratio was used with a dual injection port at zone 1 and a single injection port at both zones 3 and 4. Double start fully intermeshing screws, rotating at 125 revolutions per minute, were used throughout the entire length of the barrel with 2 sets of 25 mm length kneading blocks located at the end of zone 5. The temperature profile for each of the zones was: zone 1–30° C.; zone 2–75° C.; zone 3–100° C.; zone 4–125° C.; zone 5–150° C.; zone 6–175° C.; endcap-190° C.; meltpump-200° C.; and necktube-230° C. The feedstock reagents were maintained under a nitrogen atmosphere. A blend of 98 parts by weight Polydimethylsiloxane Diamine A, Lot 2, molecular weight 5310, and 2 parts by weight Polydimethylsiloxane Monoamine C, molecular weight 12,121 was injected at a rate of 15.13 g/min (0.00280 mol/min) into the first part of zone 1 and methylenedicyclohexylene-4,4'-diisocyanate (DESMODUR W, obtained from Miles Laboratory) was injected at a rate of 29.59 g/min (0.113 mol/min) into the second part of zone 1. Jeffamine™ D-400 polyoxypropylenediamine (obtained from Huntsman Corporation, molecular weight 466 g/mol for Lot #5C710) was injected at a rate of 21.19 g/min (0.0455 mol/min) into zone 3. Dytek A™ (2-methyl-1,5-pentanediamine obtained from DuPont, molecular weight of 116 g/mol for Lot #SC950419J01)) was injected at zone 4 at a rate of 8.33 g/min (0.0718 mol/min). The resultant polydimethylsiloxane oligourea segmented copolymer of NCO:NH$_2$ ratio 0.94:1, was extruded as a 2.5 mm diameter strand into a Fluorinert™ dryice bath and pelletized to afford a product with a bimodal distribution by GPC with an overall $M_n = 1.1 \times 10^5$.

Example 95

In Example 95, a Berstorff 25 mm diameter corotating twin screw extruder was used as in Example 94 with the following modifications. The screw, operating at 100 revolutions per minute, was constructed with double start fully intermeshing screws used in combination with partially intermeshing screws with one set of 25 mm length kneading blocks located at the start of zone 4 and three sets located at the end of zone 5. The temperature profile for each of the zones was: zone 1–30° C.; zone 2–75° C.; zone 3–100° C.; zone 4–125° C.; zone 5–150° C.; zone 6–175° C.; endcap and meltpump-175° C. and necklube—190° C. The feedstock reagents were maintained under a nitrogen atmosphere. Polydimethylsiloxane Diamine A, Lot 1, 5280 molecular weight was fed at a rate of 4.85 g/min (0.000919 mol/min) into the first part of zone 1. A blend of 20 parts by weight phenyl isocyanate (obtained from Matheson Coleman and Bell) and 80 parts by weight methylenedicyclohexylene-1,4'-diisocyanate (DESMODUR W, obtained from Miles Laboratory Lot #D233-4-0751) was fed at a rate of 12.81 g/min (0.0499 mol/min) into the second part of zone 1. Jeffamine™ D-400 polyoxypropylenediamine (obtained from Huntsman Corporation, titrated molecular weight 452 g/mol for Lot #CP5131) was injected at 19.45 g/min (0.0430 mol/min) into zone 3. And Dytek A™ (2-methyl-1,5-pentanediamine obtained from DuPont, titrated molecular weight 117 g/mol for Lot #SC94030211) was injected at zone 4 at a rate of 0.689 g/min (0.00589 mol/min). The resultant polydimethylsiloxane oligourea segmented copolymer of NCO:NH$_2$ ratio 1.00:1, was extruded as a strand to yield a product with $M_n = 3.3 \times 10^4$ by GPC analysis.

The various modifications and alterations of this invention will be apparent to those skilled in the art without departing from the scope and spirit of this invention and this invention should not be restricted to that set forth herein for illustrative purposes.

What is claimed is:

1. Polydiorganosiloxane oligourea segmented copolymers comprising (i) a pair of soft polydiorganosiloxane amine residue units, wherein the polydiorganosiloxane amine residue unit is a polydiorganosiloxane amine minus all —NDH groups with D selected from hydrogen, alkyl radicals having 1 to 10 carbon atoms, phenyl and a radical that completes a ring structure to form a heterocycle having about 6 to 20 carbon atoms, (ii) a single hard polyisocyanate residue unit, wherein the polyisocyanate residue unit is a polyisocyanate minus the —NCO groups, (iii) urea linkages connecting the isocyanate residue unit and the polydiorganosiloxane amine residue units, and (iv) terminal groups that are not reactive under moisture curing or free radical curing conditions and are not a reactive amine or a reactive isocyanate.

2. A polydiorganosiloxane oligourea segmented copolymer according to claim 1 represented by the formula:

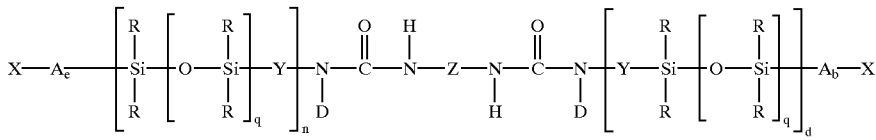

wherein
- each Z is a polyvalent radical selected from (i) arylene radicals and aralkylene radicals having from about 6 to 20 carbon atoms, and (ii) alkylene and cycloalkylene radicals having from about 6 to 20 carbon atoms;
- each R is a moiety independently selected from (i) substituted and unsubstituted alkyl moieties, (ii) substituted and unsubstituted vinyl radicals and higher alkenyl radicals, (iii) substituted and unsubstituted cycloalkyl moieties having about 6 to 12 carbon atoms, (iv) substituted and unsubstituted aryl moieties, (v) perfluoroalkyl groups, (vi) fluorine-containing groups, and (vii) perfluoroether-containing groups;
- each Y is a polyvalent moiety independently selected from (i) alkylene radicals having 1 to 10 carbon atoms, and (ii) aralkylene radicals and arylene radicals having 6 to 20 carbon atom;
- each D is independently selected from hydrogen, alkyl radicals having 1 to 10 carbon atoms, phenyl, and radicals that complete a ring structure including B or Y to form a heterocycle having about 6 to 20 carbon atoms;
- each A is independently —B—, or —YSi(R)$_2$(OSi(R)$_2$)$_p$Y- or mixtures thereof;
- B is a polyvalent radical selected from the group consisting of alkylene, aralkylene, cycloalkylene, phenylene, polyalkylene oxide and copolymers thereof, and mixtures thereof,
- e and b are o and n and d are 1;
- q is about 10 or larger; and each X is independently:
  (a) a monovalent alkyl, substituted alkyl, aryl or substituted aryl moiety that is not reactive under moisture curing or free radical curing conditions; or
  (b) a moiety represented by

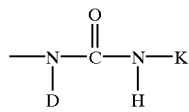

wherein D is as defined as above, and
K is a monovalent alkyl, substituted alkyl, aryl or substituted aryl moiety that is not reactive under moisture curing or free radical curing conditions.

3. The polydiorganosiloxane diamine oligourea segmented copolymer according to claim 2, wherein R is a moiety independently selected from (i) substituted and unsubstituted alkyl moieties having 1 to 12 carbon atoms, (ii) radicals represented by the formula —R$^2$(CH$_2$)$_a$CH=CH$_2$; wherein R$^2$ is —(CH$_2$)$_b$- or —(CH$_2$)$_c$CH=CH-; a is 1,2 or 3; b is 0, 3 or 6; and c is 3, 4 or 5, (iii) cycloalkyl moieties wherein the cyclo portion of the moiety has 6 to 12 carbon atoms and is substituted with an alkyl, fluoroalkyl or vinyl group, and (iv) substituted and unsubstituted aryl moieties having 6 to 20 carbon atoms.

4. A polydiorganosiloxane oligourea copolymer according to claim 2, wherein at least 50% of the R moieties are methyl radicals with the balance being monovalent alkyl or substituted alkyl radicals, alkenylene radicals, phenyl radicals, or substituted phenyl radicals.

5. The polydiorganosiloxane diamine oligourea segmented copolymer according to claim 3, wherein at least one R is a substituted alkyl moiety or substituted aryl moiety and further wherein (i) when the alkyl moiety is substituted the alkyl moiety is substituted with a trifluoroalkyl or vinyl group and (ii) when the aryl moiety is substituted the aryl moiety is substituted with an alkyl, cycloalkyl, fluoroalkyl or vinyl group.

6. A polydiorganosiloxane oligourea segmented copolymer according to claim 2, wherein X is a monovalent unsubstituted alkyl moiety having about 1 to 20 carbon atoms.

7. A polydiorganosiloxane oligourea segmented copolymer according to claim 2, wherein X is a monovalent unsubstituted aryl moiety having about 6 to 20 carbon atoms.

8. A polydiorganosiloxane oligourea segmented copolymer according to claim 2, wherein X is a monovalent alkyl moiety substituted with trifluoroalkyl groups.

9. A polydiorganosiloxane oligourea segmented copolymer according to claim 2, wherein X is an aryl moiety substituted with alkyl, aryl, or substituted aryl groups.

10. A polydiorganosiloxane oligourea segmented copolymer according to claim 2, wherein K is monovalent unsubstituted alkyl moiety.

11. A polydiorganosiloxane oligourea segmented copolymer according to claim 2, wherein K is a monovalent unsubstituted aryl moiety.

12. A polydiorganosioxane oligourea segmented copolymer according to claim 2, wherein K is a monovalent substituted alkyl moiety.

13. A polydiorganosiloxane oligourea segmented copolymer according to claim 2, wherein K is a substituted aryl moiety.

14. A polydiorganosiloxane oligourea copolymer according to claim 12 wherein Z is selected from the group consisting of 2,6-tolylene, 4,4'-methylenediphenylene, 3,3'-dimethoxy-4,4'-biphenylene, tetramethyl-m-xylylene, 4,4'-methylenedicyclohexylene, 3,5,5-trimethyl-3-methylenecyclohexylene, 2,2,4-trimethylhexylene, 1,6-hexamethylene, 1,4-cyclohexylene, and mixtures thereof.

15. A polydiorganosiloxane oligourea copolymer according to claim 14 wherein Z is tetramethyl-m-xylylene.

16. Poyldiorganosiloxane oligourea segmented copolymer comprising the reaction product of:

(a) a polyisocyanate; and
(b) a polydiorganosiloxane monoamine having a first terminal portion reactive with an isocyanate and a second terminal portion that is not reactive under moisture curing or free radical curing conditions and is not a reactive amine or a reactive isocyanate.

17. A process for preparing polydiorganosiloxane oligourea segmented copolymers comprising the steps of:
(a) providing reactants, wherein the reactants comprise (i) a polyisocyanate, (ii) a polydiorganosiloxane monoamine having a first terminal portion that is an amine and a second terminal portion that is not reactive under moisture curing or free radical curing conditions and is not a reactive amine or a reactive isocyanate, and (iii) solvent, to a reactor;
(b) mixing the reactants in the reactor;
(c) allowing the reactants to react to form a polydiorganosiloxane oligourea segmented copolymer having (i) a single hard polisocyanate residue unit, wherein the polyisocyanate residue unit is the polyisocyanate minus the —NCO groups, (ii) a pair of soft polydiorganosiloxane amine residue units, wherein the polydiorganosiloxane amine residue units are the polydiorganosiloxane monamine minus the —NDH group with D selected from hydrogen, alkyl radicals having 1 to 10 carbon atoms, phenyl and a radical that completes a ring structure to form a heterocycle having about 6 to 20 carbon atoms, and (iii) urea linkage connecting the isocyanate residue unit and the polydiorganosiloxane amine residue units; and
(d) conveying the oligomer from the reactor.

18. An essentially solventless process for preparing polydiorganosiloxane oligourea segmented copolymers comprising the steps of:
(a) continuously providing reactants to a reactor under substantially solventless conditions, wherein the reactants comprise (i) a polyisocyanate, and (ii) a polydiorganosiloxane monoamine having a first terminal portion that is an amine and a second terminal portion that is not reactive under moisture curing or free radical curing conditions and is not a reactive amine or a reactive isocyanate;
(b) mixing the reactants in the reactor under the substantially solventless conditions;
(c) allowing the reactions to react to form a polydiorganosiloxane oligourea segmented copolymer having (i) a single hard polyisocyanate residue unit, wherein the polyisocyanate residue unit is the polyisocyanate minus the —NCO groups, (ii) a pair of soft polydiorganosiloxane amine residue units, wherein the polydiorganosiloxane amine residue units are the polydiorganosiloxane monoamine minus the —NDH group with D selected from hydrogen, alkyl radicals having 1 to 10 carbon atoms, phenyl and a radical that completes a ring structure to form a heterocycle having about 6 to 20 carbon atoms, and (iii) urea linkage connecting the isocyanate residue unit and the polydiorganosiloxane amine residue units; and
(d) conveying the oligomer from the reactor.

19. Polydiorganosiloxane oligourea segmented copolymers comprising (i) soft polydiorganosiloxane amine residue units, wherein the polydiorganosiloxane amine residue units are the polydiorganosiloxane amine minus all —NDH groups with D selected from hydrogen, alkyl radicals having 1 to 10 carbon atoms, phenyl and a radical that completes a ring structure to form a heterocycle having about 6 to 20 carbon atoms, (ii) Hard polyisocyanate residue units, wherein the polyisocyanate residue units are the polyisocyanate minus the —NCO groups, (iii) moisture curable monoisocyanate residue terminal units, wherein the moisture curable monoisocyanate residue terminal units are the monoisocyanate minus the —NCO group and the moisture curable monoisocyanate residue terminal units are selected from the group consisting of propyl trimethoxysilane, propyl triethoxysilane, propyl dimethoxy (methylethylketoximino) silane, propyl diethoxy (methylethylketoximino)silane, propyl monomethoxy di(methylethylketoximino)silane, propyl monoethoxy di(methylethylketoximino) silane, and propyl tri(methylethylketoximino)silane, and (iv) urea linkages connecting the isocyanate residue units, the polydiorganosiloxane amine residue units and the moisture curable terminal groups.

20. A polydiorganosiloxane oligourea segmented copolymer according to claim 19 represented by the formula:

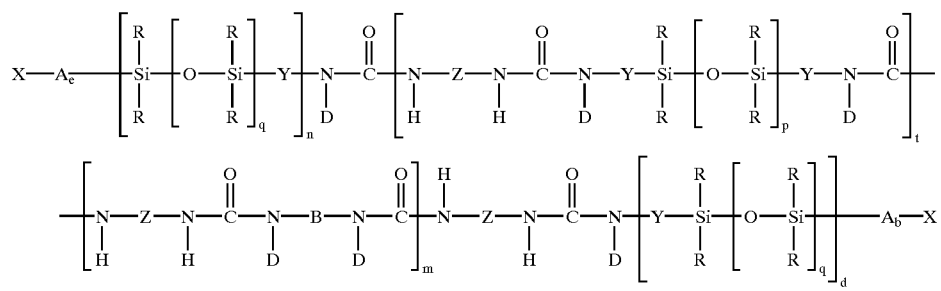

wherein
each Z is a polyvalent radical selected from (i) arylene radicals and aralkylene radicals having from about 6 to 20 carbon atoms, and (ii) alkylene and cycloaklylene radicals having from about 6 to 20 carbon atoms;
each R is a moiety independently selected from (i) substituted and unsubstituted alkyl moieties, (ii) substituted and unsubstituted vinyl radicals and higher alkenyl radicals, (iii) substituted and unsubstituted cycloalkyl moieties having about 6 to 12 carbon atoms, (iv) substituted and unsubstituted aryl moieties, (v) perfluoroalkyl groups, (vi) fluorine-containing groups, and (vii) perfluorother-containing groups;
each Y is a polyvalent moiety independently selected from (i) alkylene radicals having 1 to 10 carbon atoms, and (ii) aralkylene radicals and arylene radicals having 6 to 20 carbon atoms;
each D is independently selected from hydrogen, alkyl radicals having 1 to 10 carbon atoms, phenyl, and radicals that complete a ring structure including B or Y to form a heterocycle having about 6 to 20 carbon atoms;

each A is independently —B—, or —YSi(R)$_2$(OSi(R)$_2$)$_p$Y- or mixtures thereof;

B is a polyvalent radical selected from the group consisting of alkylene, aralyklene, cycloalkylene, phenylene, polyalkylene oxide and copolymers thereof, and mixtures thereof, m is a number that is 0 to about 8;

b, e, d and n are 0 or 1, with the provisos the b+d=1 and e+n=1;

p is about 10 or larger;

q is about 10 or larger; and t is a number which is 0 to about 8; and each X is independently a moiety represented by

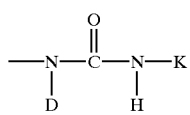

wherein D is as defined as above, and

K is a moisture curable group selected from propyl trimethoxysilane, propyl triethoxysilane, propyl dimethoxy (methylethylketoximino)silane, propyl diethoxy (methylethylketoximino)silane, propyl monomethoxy di(methylethylketoximino)silane, propyl monoethoxy di(methylethylketoximino) silane, and propyl tri(methylethylketoximino)silane.

21. The polydiorganosiloxane diamine oligourea segmented copolymer, according to claim 20, wherein R is a moiety independently selected from (i) substituted and unsubstituted alkyl moieties having 1 to 12 carbon atoms, (ii) radicals represented by the formula —R$^2$(CH$_2$)$_a$CH=CH$_2$; wherein R$^2$ is —(CH$_2$)$_b$- or —(CH$_2$)$_c$CH=CH-; a is 1, 2 or 3; b is 0, 3 or 6; and c is 3, 4 or 5, (iii) cycloalkyl moieties wherein the cyclo portion of the moiety has 6 to 12 carbon atoms and is substituted with an alkyl, fluoroalkyl or vinyl group, and (iv) substituted and unsubstituted aryl moieties having 6 to 20 carbon atoms.

22. The polydiorganosiloxane diamine oligourea segmented copolymer, according to claim 21 wherein at least one R is a substituted alkyl moiety or substituted aryl moiety and further wherein (i) when the alkyl moiety is substituted the alkyl moiety is substituted with a trifluoroalkyl or vinyl group and (ii) when the aryl moiety is substituted the aryl moiety is substituted with an alkyl, cycloalkyl, fluoroalkyl or vinyl group.

23. A polydiorganosiloxane oligourea copolymer according to claim 20 wherein at least 50% of the R moieties are methyl radicals with the balance being monovalent alkyl or substituted alkyl radicals, alkenylene radicals, phenyl radicals, or substituted phenyl radicals.

24. A polydiorganosiloxane oligourea copolymer according to claim 20 wherein Z is selected from the group consisting of 2,6-tolylene, 4,4'-methylenediphenylene, 3,3'-dimethoxy-4,4'-biphenylene, tetramethyl-m-xylylene, 4,4'-methylenedicyclohexylene, 3,5,5-trimethyl-3-methylenecyclohexylene, 2,2,4-trimethylhexylene, 1,6-hexamethylene, 1,4-cyclohexylene, and mixtures thereof.

25. A polydiorganosiloxane oligourea copolymer according to claim 24 wherein Z is tetramethyl-m-xylylene.

26. Polydiorganosiloxane oligurea segmented copolymer comprising the reaction product of:

(a) at least one polyisocyanate;

(b) at least one polydiorganosiloxane diamine; and (c) at least one non-siloxane containing endcapping agent wherein the endcapping agent has a first terminal portion reactive with an amine, and a second terminal portion that can react under moisture-cure conditions.

27. A process for preparing polydiorganosiloxane oligourea segmented copolymers comprising the steps of:

(a) providing reactants to a reactor, wherein the reactants comprise (i) at least one polyisocyanate, (ii) at least one polydiorganosiloxane diamine, and (iii) at least one non-siloxane containing endcapping agent wherein the endcapping agent has a first terminal portion of an —NCO group, and a second terminal portion that can react under moisture-cure conditions selected from the group consisting of propyl trimethoxysilane, propy triethoxysilane, propyl dimethoxy (methylethylketoximino)silane, propyl diethoxy (methylethylketoximino)silane, propyl monomethoxy di(methylethylketoximino)silane, propyl monoethoxy di(methylethylketoximino) silane, and propyl tri(methylthylketoximino)silane, and (iv) solvent;

(b) mixing the reactants in the reactor;

(c) allowing the reactants to react to form a polydiorganosiloxane oligourea segmented copolymer having (i) soft polydiorganosiloxane amine residue units, wherein the polydiorganosiloxane amine residue units are the polydiorganosiloxane amine minus all —NDH groups with D selected from hydrogen, alkyl radicals having 1 to 10 carbon atoms, phenyl and a radical that completes a ring structure to form a heterocycle having about 6 to 20 carbon atoms, (ii) hard polyisocyanate residue units, wherein the polyisocyanate residue units are the polysisocyanate minus the —NCO groups, (iii) endcapping agent residue units wherein the endcapping agent residue units are the endcapping agent minus the —NCO group, and (iv) urea linkages connecting the isocyanate residue units, the polydiorganosiloxane amine residue units and the endcapping agent residue units; and (d) conveying the oligomer from the reactor.

28. An essentially solventless process for preparing polydiorganosiloxane oligourea segmented copolymers comprising the steps of:

(a) continuously providing reactants to a reactor under substantially solventless conditions, wherein the reactants comprise (i) at least one polyisocyanate, (ii) at least one polydiorganosiloxane diamine, and (iii) at least one non-siloxane containing endcapping agent wherein the endcapping agent has a first terminal portion of an —NCO group, and a second terminal portion that can react under moisture-cure conditions;

(b) mixing the reactants in the reactor under the substantially solventless conditions;

(c) allowing the reactants to react to form a polydiorganosiloxane oligourea segmented copolymer having (i) soft polydiorganosiloxane amine residue units, wherein the polydiorganosiloxane amine residue units are the polydiorganosiloxane amine minus all —NDH groups with D selected from hydrogen, alkyl radicals having 1 to 10 carbon atoms, phenyl and a radical that completes a ring structure to form a heterocycle having about 6 to 20 carbon atoms, (ii) hard polyisocyanate residue units, wherein the polyisocyanate residue units are the polyisocyanate minus the —NCO groups, (iii) endcapping agent residue units wherein the endcapping agent residue units are the endcapping agent minus the —NCO group, and (iv) urea linkages connecting the isocyanate residue units, the polydiorganosiloxane amine residue units and the endcapping agent residue units; and (d) conveying the oligomer from the reactor.

29. Polydiorganosiloxane oligourea segmented copolymers comprising (i) soft polydiorganosiloxane amine residue units, wherein the polydiorganosiloxane amine residue units are a polydiorganosiloxane amine minus all —NDH groups with D selected from hydrogen, alkyl radicals having 1 to 10 carbon atoms, phenyl and a radical that completes a ring structure to form a heterocycle having about 6 to 20 carbon atoms, (ii) hard polyisocyanate residue units, wherein the polyisocyanate residue units are a polyisocyanate minus the —NCO groups, (iii) monoamine residue terminal units having an endcapping group, wherein the monoamine residue terminal units are a monamine minus the —NDH group with D selected from hydrogen, alkyl radicals having 1 to 10 carbon atoms, phenyl and a radical that completes a ring structure to form a heterocycle having about 6 to 20 carbon atoms, and (iv) urea linkage connecting the isocyanate residue units, the polydiorganosiloxane amine residue units and the monoamine residue terminal units, wherein the monoamine residue terminal units are connected through the —NDH group on the monoamine.

30. A polydiorganosiloxane oligourea segmented copolymer according to claim 29 represented by the formula:

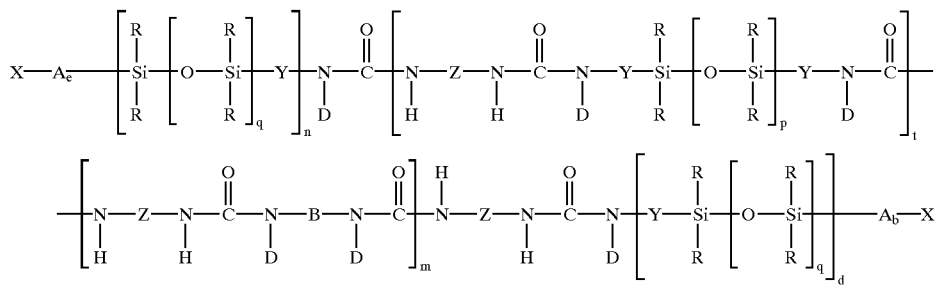

wherein
each Z is a polyvalent radical selected from (i) arylene radicals and aralkylene radicals having from about 6 to 20 carbon atoms, and (ii) alkylene and cycloalkylene radicals having from about 6 to 20 carbon atoms;
each R is a moiety independently selected from (i) substituted and unsubstituted alkyl moieties, (ii) substituted and unsubstituted vinyl radicals and higher alkenyl radicals, (iii) substituted and unsubstituted cycloalkyl moieties having about 6 to 12 carbon atoms, (iv) substituted and unsubstuted aryl moieties, (v) perfluoroalkyl groups, (vi) fluorine-containing groups, and (vii) perfluoroether-containing groups;
each Y is a polyvalent moiety independently selected from (i) alkylene radicals having 1 to 10 carbon atoms, and (ii) aralkylene radicals and arylene radicals having 6 to 20 carbon atoms;
each D is independently selected from hydrogen, alkyl radicals having 1 to 10 carbon atoms, phenyl, and radicals that complete a ring structure including B or Y to form a heterocycle having about 6 to 20 carbon atoms;
each A is independently —B—, or —YSi(R)$_2$(OSi(R)$_2$)$_p$Y- or mixtures thereof;
B is a polyvalent radical selected from the group consisting of alkylene, aralkylene, cycloclkylene, phenylene, polyalkylene oxide and copolymers thereof, and mixtures thereof, m is a number that is 0 to about 8;
b, e, d and n are 0 or 1, with the provisos that b+d=1 and e+n=1;
p is about 10 or larger;
q is about 10 or larger; and
t is a number which is 0 to about 8; and
each X is independently a moiety represented by

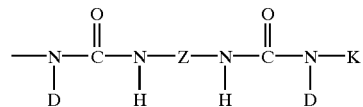

where each of Z and D are as defined as above, and
K is independently (i) a moiety that is not reactive under moisture curing or free radical curing conditions selected from the group consisting of alkyl, substituted alkyl, aryl, and substituted aryl, (ii) a free radically curable end group, or (iii) a moisture curable group.

31. The polydiorganosiloxane diamine oligourea segmented copolymer, according to claim 30, wherein R is a moiety independently selected from (i) substituted and unsubstituted alkyl moieties having 1 to 12 carbon atoms, (ii) radicals represented by the formula —R$^2$(CH$_2$)$_a$CH=CH$_2$; wherein R$^2$ is —(CH$_2$)$_b$- or —(CH$_2$)$_c$CH=CH-; a is 1, 2 or 3; b is 0, 3 or 6; and c is 3, 4 or 5, (iii) cycloalkyl moieties wherein the cyclo portion of the moiety has 6 to 12 carbon atoms and is substituted with an alkyl, fluoroalkyl or vinyl group, and (iv) substituted and unsubstituted aryl moieties having 6 to 20 carbon atoms.

32. The polydioranosiloxane diamine oligourea segmented copolymer, according to claim 31 wherein at least one R is a substituted alkyl moiety or substituted aryl moiety and further wherein (i) when the alkyl moiety is substituted the alkyl moiety is substituted with a trifluoroalkyl or vinly group and (ii) when the aryl moiety is substituted the aryl moeity is substituted with an alkyl, cycloalkyl, fluoroalkyl or vinyl group.

33. A polydiorganosiloxane oligourea copolymer according to claim 30 wherein at least 50% of the R moieties are methyl radicals with the balance being monovalent alkyl or substituted alkyl radicals, alkeylene radicals, phenyl radicals, or substituted pheyl radicals.

34. A polydiorganosiloxane oligourea copolymer according to claim 30 wherein Z is selected from the group consisting of 2,6tolylene, 4,4'-methylenediphenylene, 3,3'dimethoxy-4,4'-biphenylene, tetramethyl-m-xylylene, 4,4'-methylenedicyclohexylene, 3,5,5-trimethyl-3-methylenecyclohexylene, 2,2,4-trimethylhexylene, 1,6-hexamethylene, 1,4-cyclohexylene, and mixtures thereof.

35. A polydiorganosiloxane oligourea copolymer according to claim 34 wherein Z is tetramethyl-m-xylylene.

36. A polydiorganosiloxane oligourea copolymer according to claim 30 wherein K is a free radically curable group selected from the group consisting of acrylate, methacrylate, acrylamido, methacrylamido and vinyl.

37. A polydiorganosiloxane oligourea copolymer according to claim 30 wherein K is a moisture curable group selected from the group consisting of propyl trimethoxysilane, propyl triethoxysilane, propyl methyldimethoxysilane, propyl methyldiethoxysilane, propyl dimethoxy (methylethylketoximino)silane, propyl diethoxy (methylethylketoximino)silane, propyl monomethoxydi(methylethylketoximino)silane, propyl monoethoxydi(methylethylketoximino)silane, and propyl tri (methylethylketoximino)silane, mixtures thereof and partial hydrolyzates thereof.

38. Polydiorganosiloxane oligourea segmented copolymer comprising the reaction product of:
(a) at least one polyisocyanate;
(b) at least one polydiorganosiloxane diamine; and
(c) at least one non-siloxane containing endcapping agent wherein the endcapping agent has a first terminal portion reactive with an isocyanate, and a second terminal portion selected from the group consisting of (i) a moiety that is not reactive under moisture curing or free radical curing conditions selected from the group consisting of alkyl, substituted alkyl, aryl, and substituted aryl, (ii) a free radically curable end group, or (iii) a moisture curable group selected from the group consisting of propyl trimethoxysilane, propyl triethoxysilane, propyl methyldimethoxysilane, propyl methyldiethoxysilane, propyl dimethoxy (methylethylketoximino)silane, propyl diethoxy (methylethylketoximino)silane, propyl monomethoxydi(methylethylketoximino)silane, propyl monoethoxydi(methylethylketoximino)silane, and propyl tri(methylethylketoximono)silane, mixtures thereof and partial hydrolyzates thereof.

39. A process for preparing polydiorganosiloxane oligourea segmented copolymers comprising the steps of:
(a) providing reactants to a reactor, wherein the reactants comprise (i) at least one polyisocyanate, (ii) at least one polydiorganosiloxane diamine, and (iii) at least one non-siloxane containing endcapping agent wherein the endcapping agent has a first terminal portion reactive with an isocyanate, and a second terminal portion selected from the group consisting of (A) a moiety that is not reactive under moisture curing or free radical curing conditions selected from the group consisting of alkyl, substituted alkyl, aryl, and substituted aryl (B) a free radically curable end group, or (C) a moisture curable group selected from the group consisting of propyl trimethoxysilane, propyl triethoxysilane, propyl methyldimethoxysilane, propyl methyldiethoxysilane, propyl dimethoxy (methylethylketoximino)silane, propyl diethoxy (methylethylketoximino)silane, propyl monomethoxydi(methylethylketoximino)silane, propyl monoethoxydi(methylethylketoximino)silane, and propyl tri(methylethylketoximino)silane mixtures thereof and partial hydrolyzates thereof, and (iv) solvent;
(b) mixing the reactants in the reactor;
allowing the reactants to react to form a polydioganosiloxane oligourea segmented copolymer having (i) soft polydiorganosiloxane amine residue units, wherein the polydiorganosiloxane amine residue units are a polydiorganosiloxane amine minus all —NDH groups with D selected from hydrogen, alkyl radicals having 1 to 10 carbon atoms, phenyl and a radical that completes a ring structure to form a heterocycle having about 6 to 20 carbon atoms, (ii) hard polyisocyanate residue units, wherein the polyisocyanate residue units are a polyisocyanate minus the —NCO groups, (iii) monoamine residue terminal units, wherein the monoamine residue terminal units are a amonoamine minus the —NDH group with D selected from hydrogen, alkyl radicals having 1 to 10 carbon atoms, phenyl and a radical that completes a ring structure to form a heterocycle having about 6 to 20 carbon atoms, and the monoamine residue terminal units have an endcapping group, and (iv) urea linkages connecting the isocyanate residue units, the polydiorganosiloxane amine residue units and the monoamine residue terminal units, wherein the monoamine residue terminal units are connected through the —NDH group on the monoamine; and
(d) conveying the oligomer from the reactor.

40. an essentially solventless process for preparing polydiorganosiloxane oligourea segmented copolymers comprising the steps of:
(a) continuously providing reactants to a reactor under substantially solventless conditions, wherein the reactants comprise (i) at least one polyisocyanate, (ii) at least one polydiorganosiloxane diamine, and (iii) at least one non-siloxane containing endcapping agent wherein the endcapping agent has a first terminal portion reactive with an isoyanate, and a second terminal portion selected from the group consisting of (A) a moiety that is not reactive under moisture curing or free radical curing conditions selected from the group consisting of alkyl, substituted alkyl, aryl, and substituted aryl, (B) a free radically curable end group, or (C) a moisture curable group selected from the group cosisting of propyl trimethoxysilane, propyl triethoxysilane, propyl methyldimethoxysilane, propyl methyldiethoxysilane, proply dimethoxy (methylethylketoximino)silane, propyl diethoxy (methylethylketoximino)silane, propyl monomethoxydi(methylethylketoximino)silane, propyl monoethoxydi(methylethylketoximino)silane, and propyl tri(methylethylketoximino)silane mixtures thereof and partial hydrolyzates thereof;
(b) mixing the reactants in the reactor under the substantially solventless conditions;
(c) allowing the reactants to react to form a polydiorganosiloxane oligourea segmented copolymer having (i) soft polydiorganosiloxane amine residue units, wherein the polydiorganosiloxane amine residue units are a polydiorganosiloxane amine minus all —NDH groups with D selected from hydrogen, alkyl radicals having 1 to 10 carbon atoms, phenyl and a radical that completes a ring structure to from a hetercycle having about 6 to 20 carbon atoms, (ii) hard polyisocyanate residue units, wherein the polyisocyanate residue units are a polyisocyanate minus the —NCO groups, (iii) monoamine residue terminal units, wherein the monoamine residue terminal units are a monoamine minus the —NDH group with D selected from hydrogen, alkyl radicals having 1 to 10 carbon atoms, phenyl and a radical that completes a ring structure to form a heterocycle having about 6 to 20 carbon atoms, and the monoamine residue terminal units have an endcapping group, and (iv) urea linkages connecting the isocyanate residue units, the polydiorganosiloxane amine residue units and the monoamine residue terminal units, wherein the monoamine residue terminal units are connected through the —NDH group on the monoamine; and
(d) conveying the oligomer from the reactor.

* * * * *

UNITED STATES PATENT AND TRADEMARK OFFICE
CERTIFICATE OF CORRECTION

PATENT NO.   : 6,441,118 B2
DATED        : August 27, 2002
INVENTOR(S)  : Sherman, Audrey A.

It is certified that error appears in the above-identified patent and that said Letters Patent is hereby corrected as shown below:

Column 8,
Line 41, "a" should read -- an --.

Column 10,
Lines 20 and 45, "were" should read -- where --.

Column 11,
Line 2, "nmoisture" should read -- moisture --.

Column 12,
Line 8, "andp" should read -- and p --.

Column 19,
Line 58, "3aminopropyldimethyfluorosilane" should read
-- 3-aminopropyldimethylfluorosilane --.

Column 22,
Line 50, insert -- . -- after "temperature".

Column 23,
Line 49, "of3.41" should read -- of 3.41 --.

Column 26,
Line 67, "weight10,700" should read -- weight 10,700 --.

Column 29,
Line 39, "copolymers were" should read -- copolymer was --.

Column 30,
Line 28, delete "or" and insert -- of --.

Column 32,
Line 50, insert -- Examples -- 55-58 --.

Column 33,
Line 54, "KB1" should read -- KB-1 --.

UNITED STATES PATENT AND TRADEMARK OFFICE
CERTIFICATE OF CORRECTION

PATENT NO. : 6,441,118 B2
DATED : August 27, 2002
INVENTOR(S) : Sherman, Audrey A.

It is certified that error appears in the above-identified patent and that said Letters Patent is hereby corrected as shown below:

Column 34,
Line 22, delete "was" and insert -- were --.

Column 36,
Line 42, "mnechanical" should read -- mechanical --.

Column 38,
Line 1, delete "pairs" and insert -- parts --.
Line 9, "5,280" should read -- 5280 --.
Lines 9, 32 and 52, insert -- to -- following "added"
Line 48, "friom" should read -- from --.
Line 50, "Tehe" should read -- The --.

Column 41,
Line 61, delete "," following "grams".

Column 42,
Line 28, "lot" should read -- Lot --.

Column 44,
Line 43, delete"1" and insert -- 4 --.

Column 47,
Line 27, "linkage" should read -- linkages --.

Column 48,
Line 15, "Hard" should read -- hard --.
Line 61, "perflurother" should read -- perfluoroether --.

Column 49,
Line 11, delete "the" and insert -- that --.

Column 50,
Line 16, "propy" should read -- propyl --.

Column 51,
Line 23, "monamine" should read -- monoamine --.

UNITED STATES PATENT AND TRADEMARK OFFICE
CERTIFICATE OF CORRECTION

PATENT NO.    : 6,441,118 B2
DATED         : August 27, 2002
INVENTOR(S)   : Sherman, Audrey A.

It is certified that error appears in the above-identified patent and that said Letters Patent is hereby corrected as shown below:

Column 52,
Line 47, "polydioranosiloxane" should read -- polydiorganosiloxane --.
Line 50, "vinly" should read -- vinyl --.
Line 57, "alkeylene" should read -- alkenylene --.
Line 58, "pheyl" should read -- phenyl --.

Column 53,
Line 60, insert -- (c) -- preceding "allowing".

Column 54,
Line 16, "an" should read -- An --.

Signed and Sealed this

Fifth Day of August, 2003

JAMES E. ROGAN
*Director of the United States Patent and Trademark Office*